(12) United States Patent
Nishijima et al.

(10) Patent No.: US 9,879,628 B2
(45) Date of Patent: Jan. 30, 2018

(54) FAILURE DIAGNOSIS DEVICE OF EMISSION CONTROL SYSTEM

(71) Applicant: TOYOTA JIDOSHA KABUSHIKI KAISHA, Toyota-shi, Aichi-ken (JP)

(72) Inventors: Hirokazu Nishijima, Ebina (JP); Toru Kidokoro, Hadano (JP); Kazuya Takaoka, Gotemba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/064,809

(22) Filed: Mar. 9, 2016

(65) Prior Publication Data

US 2016/0265461 A1   Sep. 15, 2016

(30) Foreign Application Priority Data

Mar. 13, 2015   (JP) .................................. 2015-051255

(51) Int. Cl.
*B01D 53/94*   (2006.01)
*F02D 41/02*   (2006.01)
(Continued)

(52) U.S. Cl.
CPC ......... *F02D 41/0235* (2013.01); *F01N 3/021* (2013.01); *F01N 3/0814* (2013.01); *F01N 3/0828* (2013.01); *F01N 3/0842* (2013.01); *F01N 3/0871* (2013.01); *F01N 3/2066* (2013.01); *F01N 3/2073* (2013.01);
(Continued)

(58) Field of Classification Search
CPC ...... F02D 41/0235; F01N 11/00; F01N 3/021; F01N 3/0828; F01N 3/0814; F01N 2570/18; F01N 2570/14
See application file for complete search history.

(56) References Cited

U.S. PATENT DOCUMENTS

| 8,707,807 B2 | 4/2014 | Yadav et al. |
| 2012/0090582 A1* | 4/2012 | Yacoub ..................... F01N 9/00 |
| | | 123/568.11 |
| 2012/0227377 A1* | 9/2012 | Hopka .................... F01N 11/00 |
| | | 60/274 |

(Continued)

FOREIGN PATENT DOCUMENTS

| EP | 2 199 553 B1 | 8/2012 |
| JP | 2013-87653 | 5/2013 |

(Continued)

*Primary Examiner* — Patrick Maines
(74) *Attorney, Agent, or Firm* — Finnegan, Henderson, Farabow, Garrett & Dunner, LLP

(57) ABSTRACT

In a failure diagnosis device of an emission control system that utilizes an electrode-based PM sensor to diagnose a failure of a particulate filter, some embodiments may be to suppress reduction of accuracy of diagnosis of a failure due to in-cylinder rich control. The failure diagnosis device of the emission control system performs a measurement process. The measurement process includes a sensor recovery process of removing PM depositing between the electrodes of the electrode-based PM sensor, a process of starting application of the predetermined voltage to the electrodes of the PM sensor after completion of the sensor recovery process, and a process of obtaining an output value of the PM sensor after elapse of a predetermined time period since the start of application of the predetermined voltage to the electrodes of the PM sensor.

4 Claims, 10 Drawing Sheets

(51) Int. Cl.
  *F01N 3/08* (2006.01)
  *F01N 3/20* (2006.01)
  *F01N 9/00* (2006.01)
  *F01N 11/00* (2006.01)
  *F01N 3/021* (2006.01)

(52) U.S. Cl.
  CPC ............... F01N 9/00 (2013.01); F01N 11/00 (2013.01); *F01N 2430/06* (2013.01); *F01N 2560/025* (2013.01); *F01N 2560/05* (2013.01); *F01N 2560/20* (2013.01); *F01N 2570/14* (2013.01); *F01N 2570/18* (2013.01); *F01N 2900/1614* (2013.01); *Y02T 10/24* (2013.01); *Y02T 10/47* (2013.01)

(56) References Cited

U.S. PATENT DOCUMENTS

| | | | |
|---|---|---|---|
| 2013/0298535 A1 | 11/2013 | Aoki | |
| 2014/0230415 A1* | 8/2014 | Shimode | B01D 53/9477 60/286 |
| 2014/0234174 A1* | 8/2014 | Shibata | B01D 53/9477 422/111 |
| 2015/0301009 A1* | 10/2015 | Miyake | F01N 3/023 422/83 |
| 2016/0069241 A1 | 3/2016 | Takaoka | |

FOREIGN PATENT DOCUMENTS

| | | | |
|---|---|---|---|
| JP | 2013087653 A * | 5/2013 | |
| JP | 2016-056701 A | 4/2016 | |
| WO | WO 2016/024398 A1 | 2/2016 | |

* cited by examiner

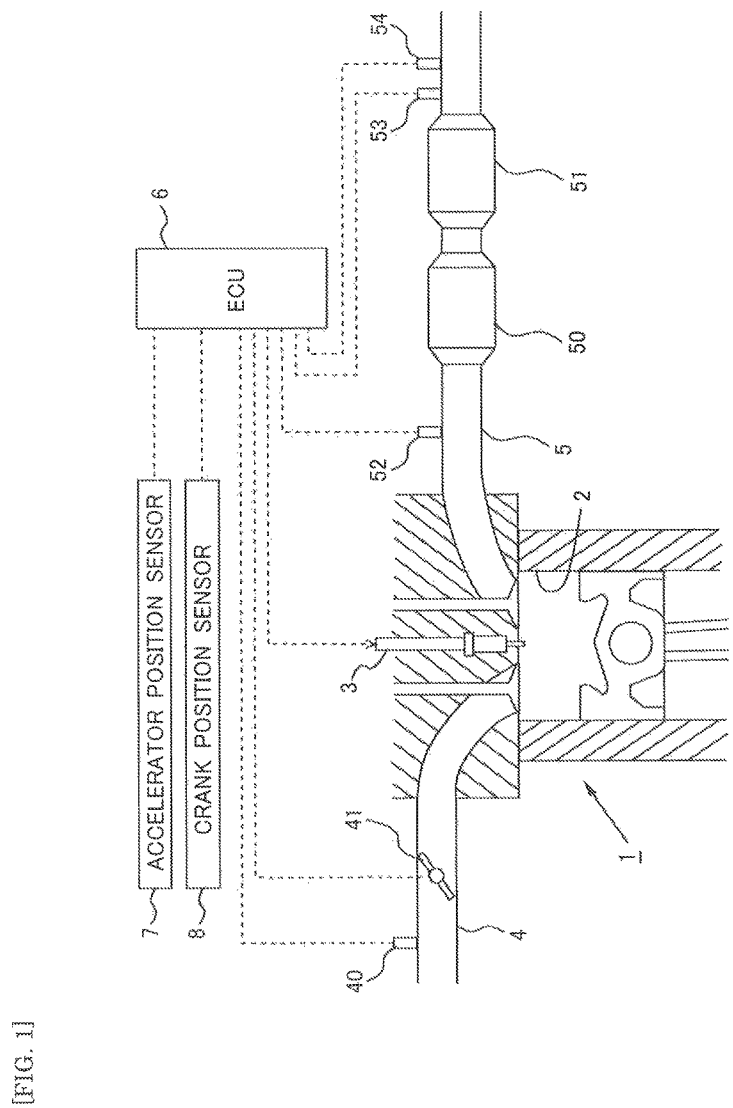
[FIG. 1]

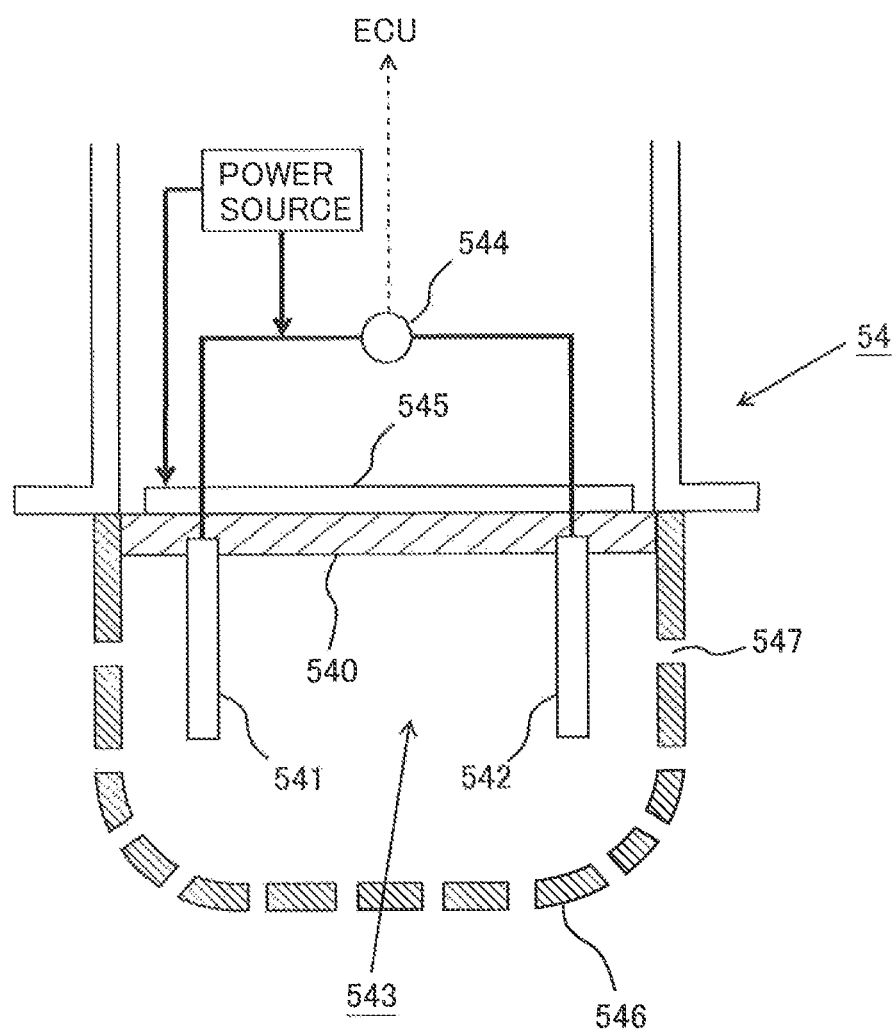
[Fig. 2]

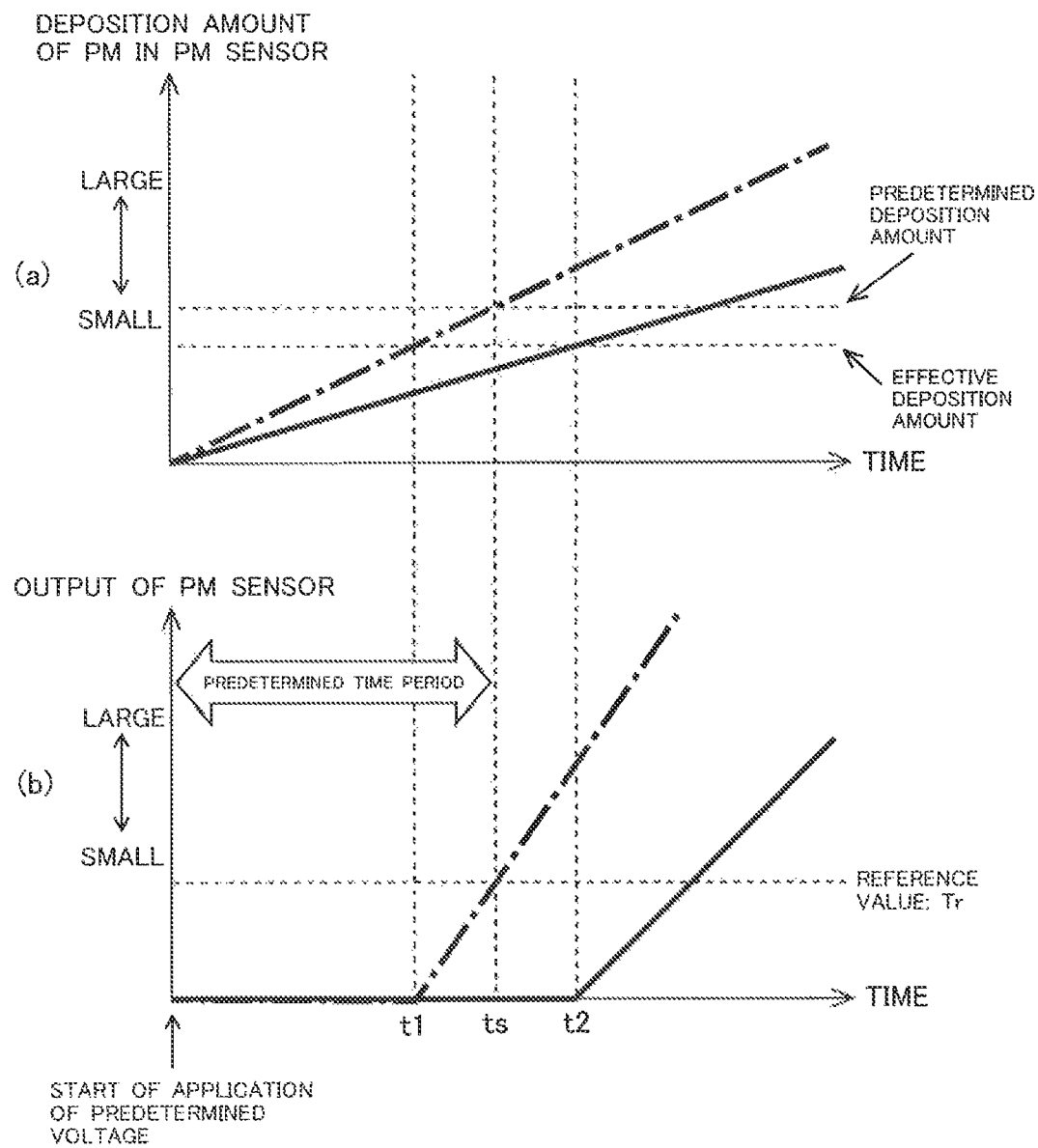

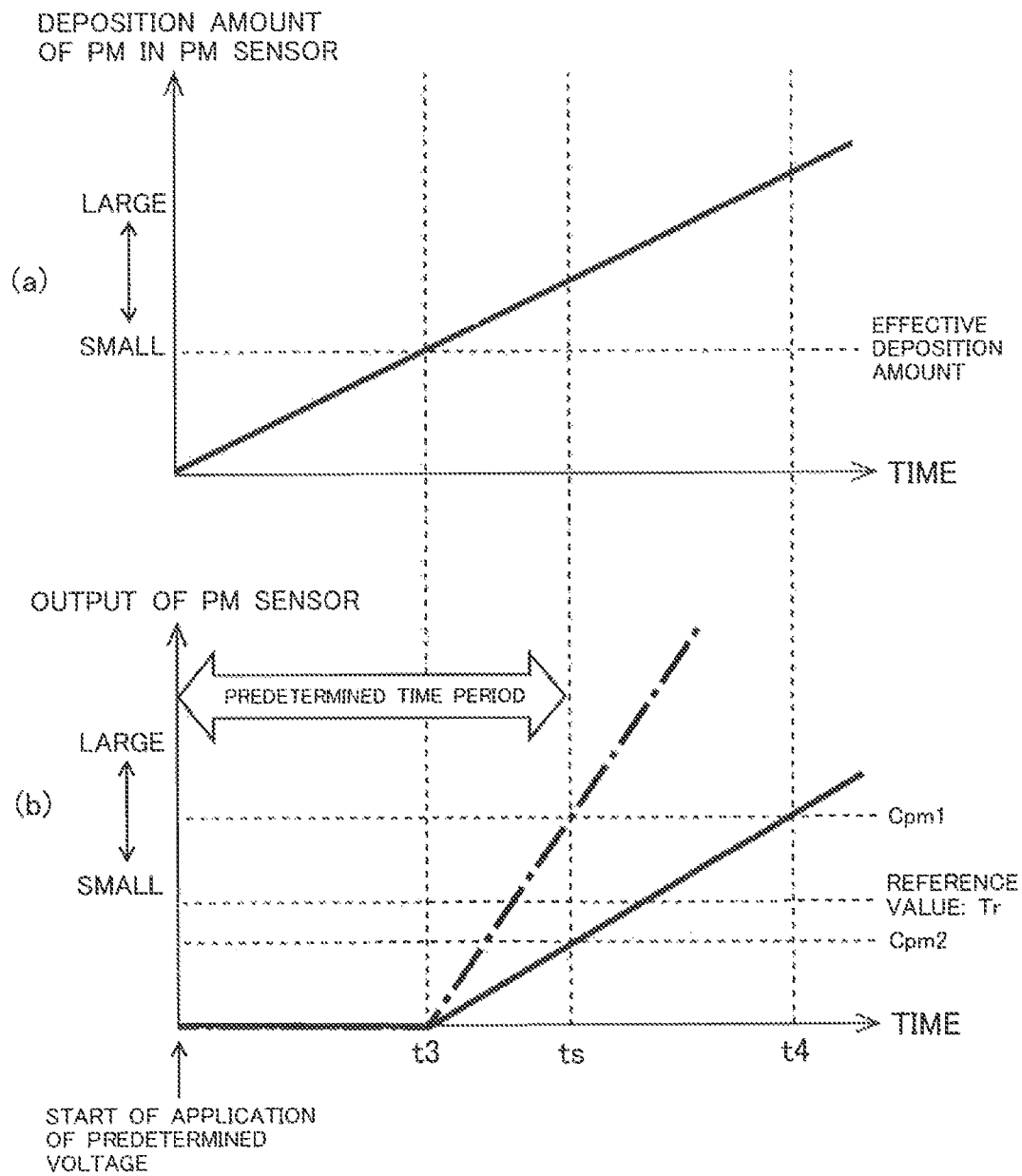

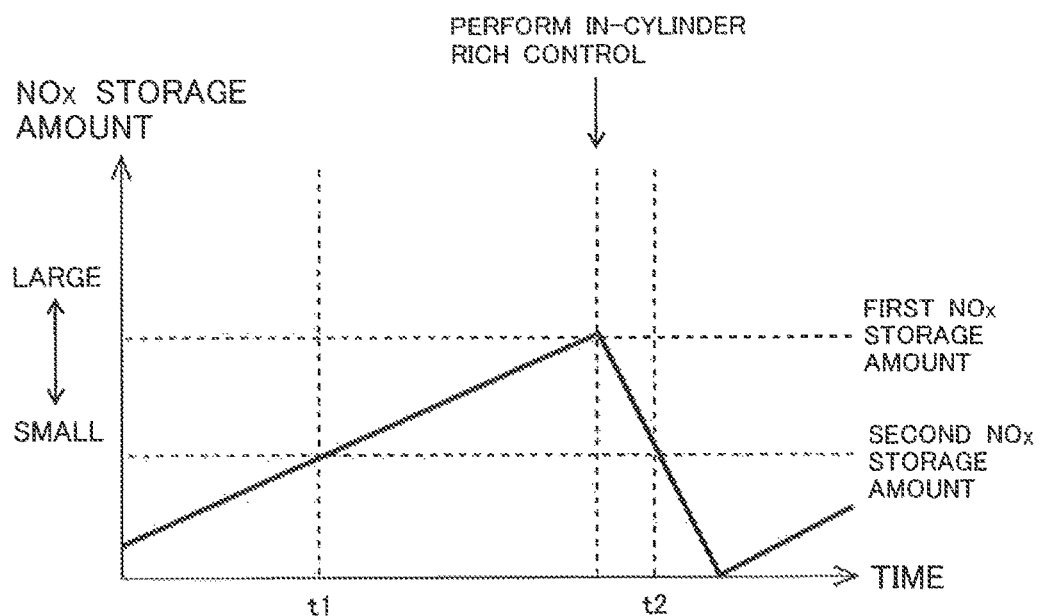

[Fig. 6]
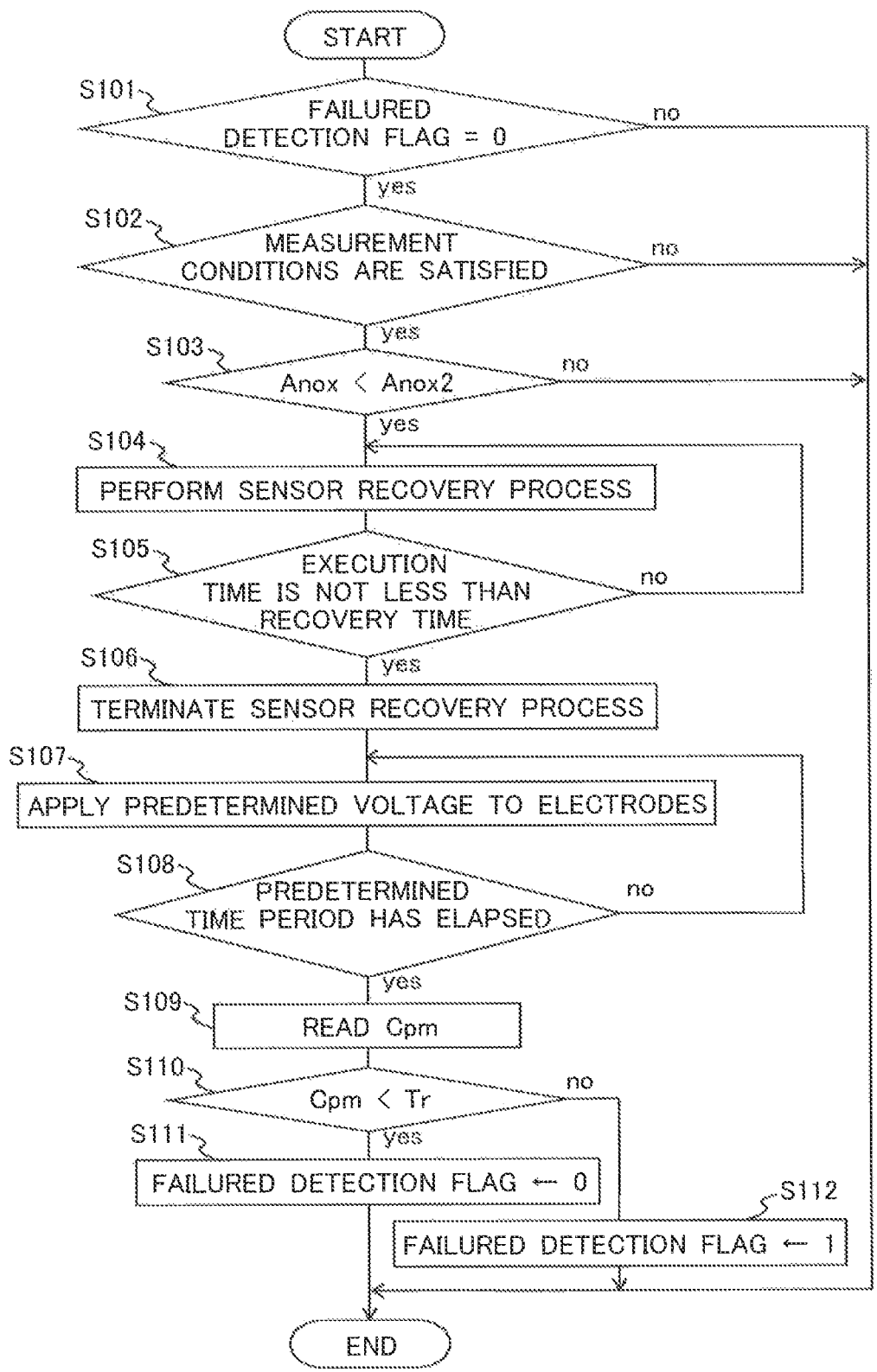

[Fig. 7]
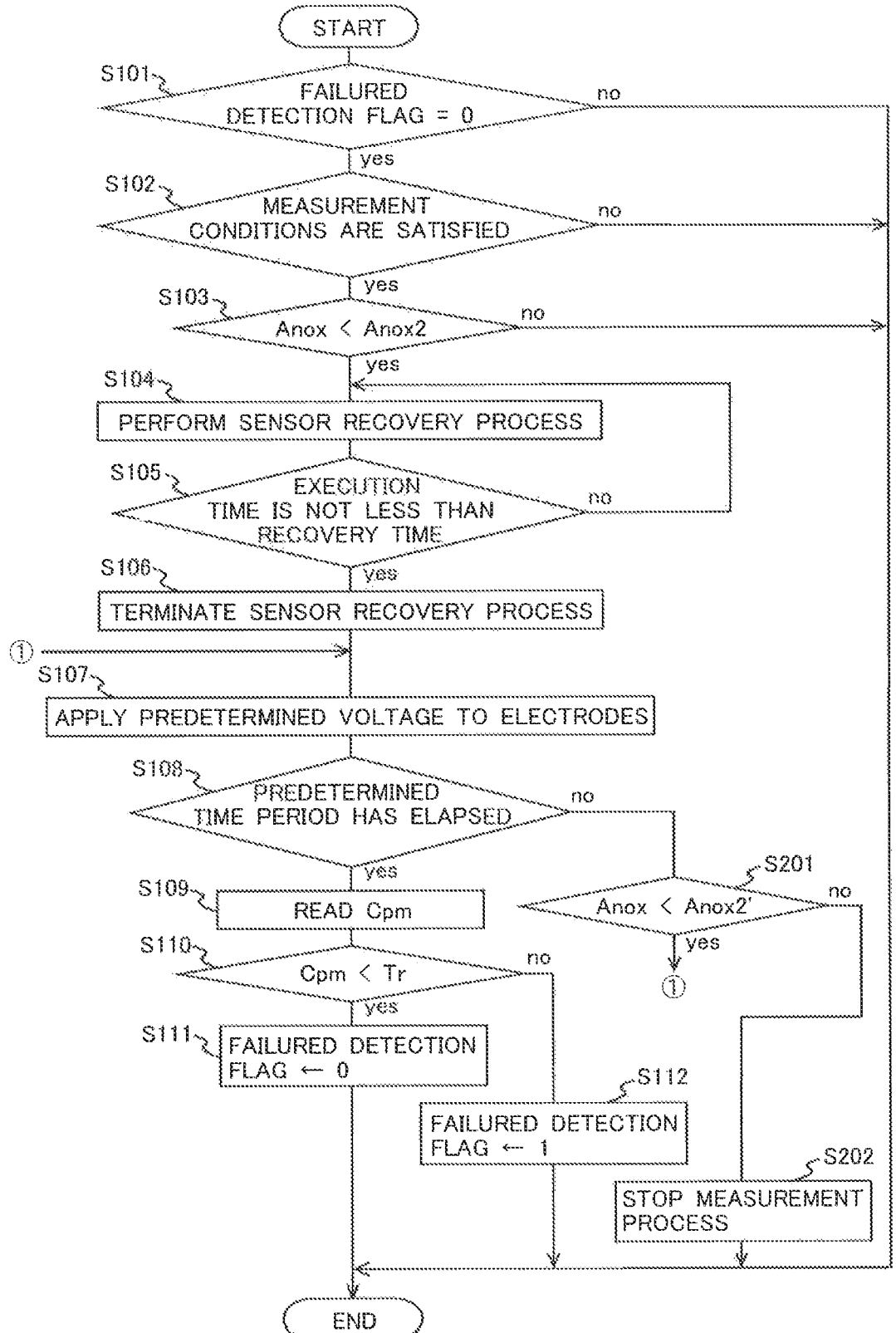

[Fig. 8]
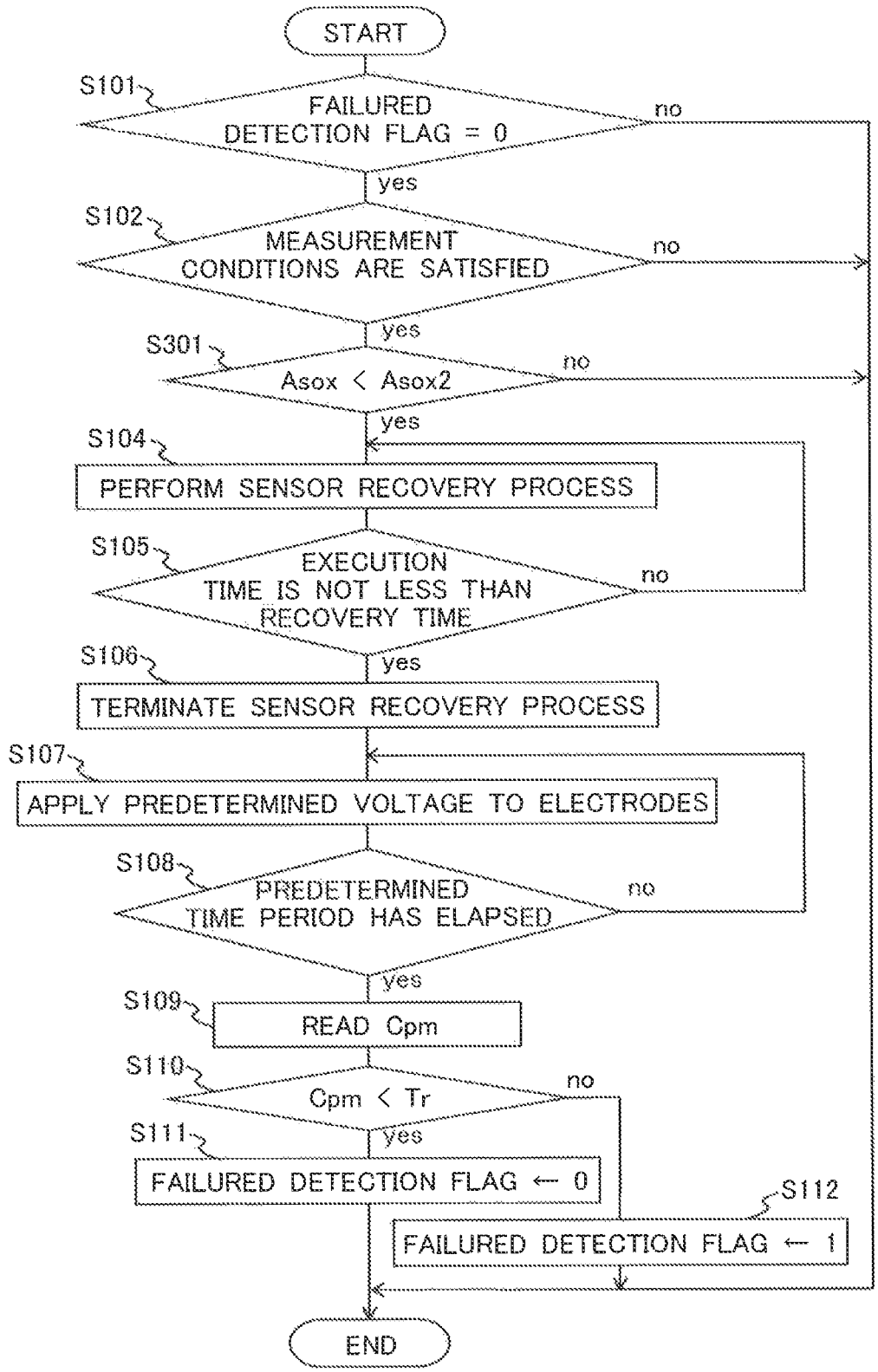

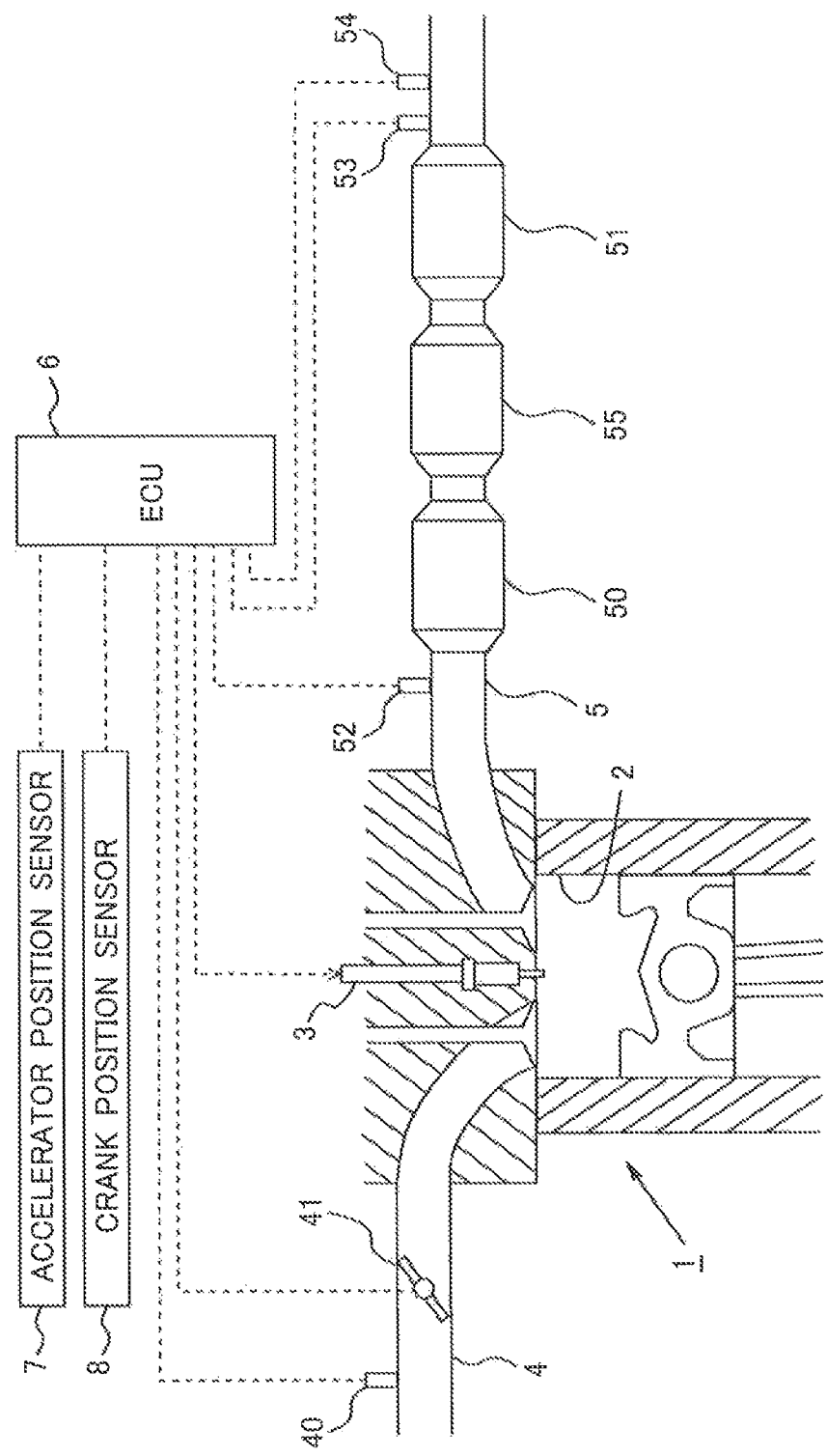
[FIG. 9]

[Fig. 10]
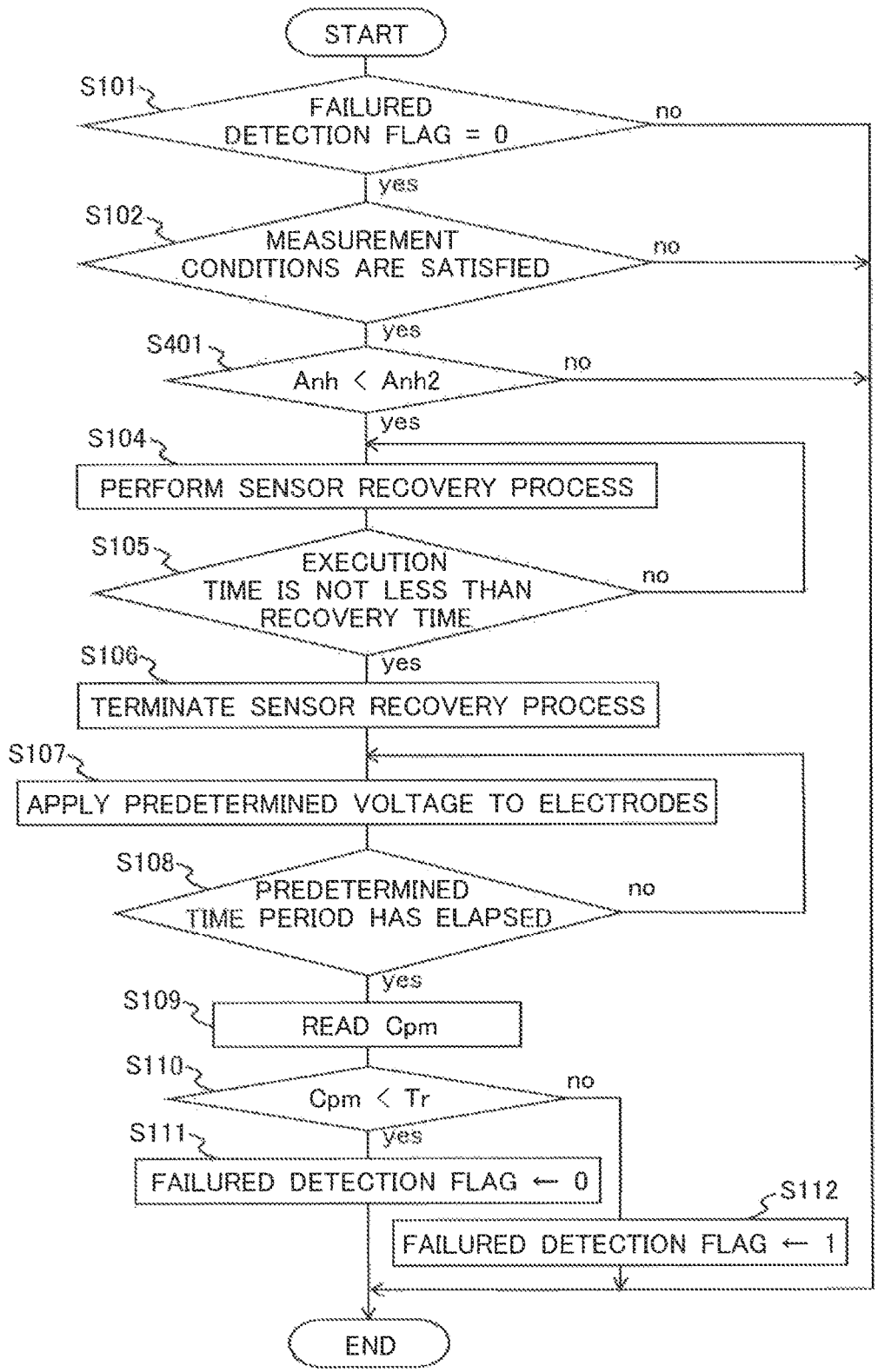

FAILURE DIAGNOSIS DEVICE OF EMISSION CONTROL SYSTEM

CROSS-REFERENCE TO RELATED APPLICATION

This application is based upon and claims the benefit of priority from Japanese Patent Application No. 2015-051255, filed on Mar. 13, 2015, which is incorporated herein by reference in its entirety.

TECHNICAL FIELD

The present disclosure relates to a technique of diagnosing a failure of an emission control system including a particulate filter that is placed in an exhaust conduit of an internal combustion engine and more specifically relates to a technique of diagnosing a failure of a particulate filter by utilizing an electrode-based particular matter (hereinafter "PM") sensor that is placed downstream of the particulate filter in the exhaust conduit.

BACKGROUND

An existing sensor for detecting the amount of PM (particulate matter) included in exhaust gas is an electrode-based PM sensor that includes electrodes arranged to be opposed to each other across an insulating layer and utilizes an electrical characteristic that the value of electric current flowing between the electrodes is varied according to the amount of PM depositing between the electrodes.

An existing method of diagnosing a failure (abnormality) of a particulate filter by utilizing an electrode-based PM sensor compares an output value of the PM sensor (value of electric current flowing between electrodes of the PM sensor) at the time when a predetermined time period has elapsed since termination of a process of removing PM depositing between the electrodes of the PM sensor (hereinafter referred to as "sensor recovery process") with a predefined reference value, and diagnoses that the particulate filter has a failure when the output value of the PM sensor is higher than the predefined reference value.

SUMMARY

An emission control system of an internal combustion engine includes a three-way catalyst or an NSR ($NO_X$ storage reduction) catalyst, in addition to a particulate filter. This emission control system may perform a process of supplying a non-combusted fuel component (for example, hydrocarbon (HC)) to the three-way catalyst or the NSR catalyst to convert $NO_X$ stored in or adsorbed to the NSR catalyst or to produce ammonia ($NH3$) by the three-way catalyst or the NSR catalyst (rich spike process). A technique of the rich spike process controls the air-fuel ratio of an air-fuel mixture that is subjected to combustion in a cylinder of the internal combustion engine to a rich air-fuel ratio which is lower than a stoichiometric air-fuel ratio (hereinafter referred to as "in-cylinder rich control").

As the result of intensive experiments and examinations, it has been discovered that the output value of the PM sensor (value of electric current flowing between electrodes) may be lower in the case where the rich spike process by the in-cylinder rich control is performed than in the case where the rich spike process is not performed on the assumption that a fixed amount of PM flows into the PM sensor. Accordingly, performing the rich spike process by the in-cylinder rich control in the predetermined time period leads to the possibility that the output value of the PM sensor after elapse of the predetermined time period becomes lower than the predefined reference value even when the particulate filter has a failure. This may lead to an inaccurate diagnosis that the particulate filter that actually has a failure is diagnosed to have no failure.

By taking into account the above problems, in a failure diagnosis device of an emission control system that utilizes an electrode-based PM sensor provided downstream of a particulate filter in an exhaust conduit to diagnose a failure of the particulate filter, disclosed embodiments may suppress reduction of accuracy of diagnosis of a failure due to in-cylinder rich control.

A failure diagnosis device of an emission control system, in accordance with the present disclosure, starts application of a predetermined voltage to electrodes of an electrode-based PM sensor after completion of a sensor recovery process to remove PM depositing between the electrodes of the PM sensor, and diagnoses a failure of a particulate filter based on the output of the PM sensor measured after elapse of a predetermined time period. The failure diagnosis device does not perform a measurement process on prediction that in-cylinder rich control is performed in the predetermined time period.

More specifically, according to one aspect of the disclosure, there is provided a failure diagnosis device of an emission control system that is applied to the emission control system comprising a particulate filter that is placed in an exhaust conduit of an internal combustion engine and is configured to trap PM in exhaust gas; an exhaust gas purification device that is placed upstream of the particulate filter in the exhaust conduit and is configured to purify the exhaust gas by utilizing a non-combusted fuel component included in the exhaust gas; and a supplier that is configured to perform in-cylinder rich control of changing an air-fuel ratio of an air-fuel mixture subjected to combustion in the internal combustion engine to a rich air-fuel ratio which is lower than a stoichiometric air-fuel ratio, so as to supply the non-combusted fuel component to the exhaust gas purification device. The failure diagnosis device comprises a PM sensor that is provided to detect an amount of PM flowing out of the particulate filter, the PM sensor including electrodes opposed to each other across an insulating layer and being configured to output an electric signal relating to a value of electric current flowing between the electrodes under application of a predetermined voltage to the electrodes; and a controller comprising at least one processor configured to perform a process of diagnosing a failure of the particulate filter, based on an output value of the PM sensor. The controller is configured to perform a measurement process, the measurement process including a sensor recovery process of removing PM depositing between the electrodes of the PM sensor, a process of starting application of the predetermined voltage to the electrodes of the PM sensor after completion of the sensor recovery process, and a process of obtaining an output value of the PM sensor after elapse of a predetermined time period since the start of application of the predetermined voltage; diagnose a failure of the particulate filter by comparing the obtained output value of the PM sensor with a predefined reference value; predict whether the in-cylinder rich control is performed in the predetermined time period, before the measurement process and/or during the measurement process; and perform the measurement process or continue the measurement process when it is predicted that the in-cylinder rich control is not performed in the predetermined time period, and do not perform the measurement process or stop the measurement process when it is predicted that the in-cylinder rich control is performed in the predetermined time period.

The "electric signal relating to the value of electric current flowing between the electrodes" herein may be a value of electric current flowing between the electrodes or may be a resistance value between the electrodes. "Before the measurement process" herein may be any time when the measurement process including the sensor recovery process is not performed during operation of the internal combustion engine, for example, any timing in a time duration between termination or stop of a measurement process and start of a subsequent measurement process or any timing in a time duration between start of the internal combustion engine and start of a first measurement process.

The occurrence of a failure such as breakage or erosion in part of a particulate filter increases the amount of PM that slips through the particulate filter. This increases the amount of PM adhering or depositing between the electrodes of the PM sensor in the predetermined time period in the case where the particulate filter has a failure, compared with the case where the particulate filter has no failure. As a result, the resistance value between the electrodes at the time when the predetermined time period has elapsed since start of application of the predetermined voltage to the electrodes of the PM sensor (hereinafter referred to as "reading timing") is lower in the case where the particulate filter has a failure than in the case where the particulate filter has no failure. The value of electric current flowing between the electrodes at the reading timing is accordingly higher in the case where the particulate filter has a failure than in the case where the particulate filter has no failure. This allows for diagnosis of whether the particulate filter has a failure by comparing the output value of the PM sensor at the reading timing with a predefined reference value. For example, with regard to the PM sensor that is configured to output the value of electric current flowing between the electrodes, when the output value of the PM sensor at the reading timing is lower than a predefined reference value (current value), diagnosis indicates that the particulate filter has no failure. When the output value of the PM sensor at the reading timing is equal to or higher than the predefined reference value, on the other hand, diagnosis indicates that the particulate filter has a failure. With regard to the PM sensor that is configured to output the resistance value between the electrodes, when the output value of the PM sensor at the reading timing is higher than a predefined reference value (resistance value), diagnosis indicates that the particulate filter has no failure. When the output value of the Pm sensor at the reading timing is equal to or lower than the predefined reference value, on the other hand, diagnosis indicates that the particulate filter has a failure.

The predetermined time period herein denotes a time duration specified to provide a significant difference between the output values of the PM sensor at the reading timing in the case where the particulate filter has a failure and in the case where the particulate filter has no failure and may be determined in advance by a fitting operation based on an experiment or the like. The predefined reference value is provided such as to determine that at least part of the particulate filter has a failure such as breakage or erosion when the current value output from the PM sensor at the reading timing is equal to or higher than the predefined reference value (or when the resistance value output from the PM sensor at the reading timing is equal to or lower than the predefined reference value). In other words, the predefined reference value corresponds to a value output from the PM sensor at the reading timing when the measurement process is performed for a particulate filter that is on the boundary between normal and abnormal.

Intensive experiments and examinations have resulted in obtaining the finding that the output value of the PM sensor at the reading timing is lower in the case where in-cylinder rich control is performed in the predetermined time period than in the case where the in-cylinder rich control is not performed. This may be attributed to the following reasons. The stronger linkage of SOF (Soluble Organic Fraction) with soot included in the exhaust gas of the internal combustion engine is expected in the case where the in-cylinder rich control is performed than in the case where the in-cylinder rich control is not performed. Accordingly, when the in-cylinder rich control is not performed, SOF is expected to hardly adhere and deposit between the electrodes of the PM sensor, while only soot is expected to adhere and deposit between the electrodes of the PM sensor. When the in-cylinder rich control is performed, on the other hand, SOF as well as soot is expected to adhere and deposit between the electrodes of the PM sensor. The electrical conductivity of SOF is lower than the electrical conductivity of soot. It is accordingly expected to increase the resistance value between the electrodes and thereby decrease the value of electric current flowing between the electrodes in the case where a large amount of SOF deposits between the electrode of the PM sensor, compared with the case where a small amount of SOF deposits.

In the case where the in-cylinder rich control is performed in the predetermined time period, there is a possibility that the current value output from the PM sensor at the reading timing becomes lower than the predefined reference value (or the resistance value output from the PM sensor at the reading timing becomes higher than the predefined reference value) even when the particulate filter has a failure. When diagnosis of a failure of the particulate filter is performed based on the output value of the PM sensor at the reading timing in the case where the in-cylinder rich control is performed in the predetermined time period, there is accordingly a possibility that the particulate filter that actually has a failure is incorrectly diagnosed to have no failure.

The failure diagnosis device of the emission control system according to the above aspect of the disclosure predicts whether the in-cylinder rich control is performed in the predetermined time period, before the measurement process and/or during the measurement process. When the measurement process has not yet been started at the time of prediction that the in-cylinder rich control is performed in the predetermined time period, the measurement process is not performed. When the measurement process has already been started at the time of prediction that the in-cylinder rich control is performed in the predetermined time period, the measurement process is stopped at the time of prediction. This accordingly reduces the incorrect diagnosis described above. In terms of reducing the incorrect diagnosis described above, one available method may stop the measurement process at the time when the in-cylinder rich control is actually performed. This method may, however, increase power consumption between the start and the stop of the measurement process. The failure diagnosis device of the emission control system according to the above aspect of the disclosure predicts that the in-cylinder rich control is performed in the predetermined time period before the in-cylinder rich control is actually performed, and does not perform the measurement process or stops the measurement process. This reduces the power consumption, compared with a method of stopping the measurement process at the time when the in-cylinder rich control is actually performed.

When the measurement process is not performed on prediction that the in-cylinder rich control is performed in the predetermined time period before the measurement process, this aspect of the disclosure may stand by for the measurement process upon a subsequent request for performing the measurement process or may perform the measurement process immediately after completion of the in-cylinder rich control. When the measurement process is stopped on prediction that the in-cylinder rich control is performed in the predetermined time period during the measurement process, this aspect of the disclosure may restart the measurement process from the beginning upon a subsequent request for performing the measurement process or may interrupt the measurement process until completion of the in-cylinder rich control and restart the interrupted measurement process after completion of the in-cylinder rich control.

In the failure diagnosis device of the emission control system of the above aspect, the exhaust gas purification device may include an $NO_X$ storage reduction catalyst that is configured to store $NO_X$ in the exhaust gas when an air-fuel ratio of the exhaust gas is a lean air-fuel ratio higher than the stoichiometric air-fuel ratio and to reduce $NO_X$ stored in the $NO_X$ storage reduction catalyst when the air-fuel ratio of the exhaust gas is a rich air-fuel ratio lower than the stoichiometric air-fuel ratio. The supplier may perform the in-cylinder rich control for the purpose of reducing $NO_X$ stored in the $NO_X$ storage reduction catalyst, when a $NO_X$ storage amount of the $NO_X$ storage reduction catalyst becomes equal to or greater than a first $NO_X$ storage amount. The controller may predict that the in-cylinder rich control is performed in the predetermined time period when the $NO_X$ storage amount of the $NO_X$ storage reduction catalyst is equal to or greater than a second $NO_X$ storage amount which is smaller than the first $NO_X$ storage amount, while predicting that the in-cylinder rich control is not performed in the predetermined time period when the $NO_X$ storage amount of the $NO_X$ storage reduction catalyst is less than the second $NO_X$ storage amount. The "second $NO_X$ storage amount" herein is provided as a $NO_X$ storage amount that causes the in-cylinder rich control for the purpose of reducing $NO_X$ stored in the $NO_X$ storage reduction catalyst to be performed in the predetermined time period in the case where the measurement process is performed in the state that the $NO_X$ storage amount is equal to or greater than the second $NO_X$ storage amount or as a $NO_X$ storage amount that causes the in-cylinder rich control for the purpose of reducing $NO_X$ stored in the $NO_X$ storage reduction catalyst to be performed in the predetermined time period in the case where the $NO_X$ storage amount becomes equal to or greater than the second $NO_X$ storage amount during the measurement process, and is determined in advance by experiment. This configuration allows for prediction of whether the in-cylinder rich control is performed in the predetermined time period, before the in-cylinder rich control is performed for the purpose of reducing $NO_X$ stored in the $NO_X$ storage reduction catalyst. On prediction that the in-cylinder rich control for the purpose of reducing $NO_X$ stored in the $NO_X$ storage reduction catalyst is performed in the predetermined time period, the configuration of this aspect does not perform the measurement process or stops the measurement process.

In the case where the exhaust gas purification device includes the $NO_X$ storage reduction catalyst, when the sulfur poisoning amount of the $NO_X$ storage reduction catalyst is increased to a certain level, in-cylinder rich control is performed for the purpose of eliminating sulfur poisoning of the $NO_X$ storage reduction catalyst. In the emission control system where the exhaust gas purification device includes the $NO_X$ storage reduction catalyst and the supplier performs the in-cylinder rich control when the sulfur poisoning amount of the $NO_X$ storage reduction catalyst becomes equal to or greater than a first poisoning amount, the controller may predict that the in-cylinder rich control is performed in the predetermined time period when the sulfur poisoning amount of the $NO_X$ storage reduction catalyst is equal to or greater than a second poisoning amount that is smaller than the first poisoning amount. The "second poisoning amount" herein is provided as a sulfur poisoning amount that causes the in-cylinder rich control for the purpose of eliminating sulfur poisoning of the $NO_X$ storage reduction catalyst to be performed in the predetermined time period in the case where the measurement process is performed in the state that the sulfur poisoning amount is equal to or greater than the second poisoning amount or as a sulfur poisoning amount that causes the in-cylinder rich control for the purpose of eliminating sulfur poisoning of the $NO_X$ storage reduction catalyst to be performed in the predetermined time period in the case where the sulfur poisoning amount becomes equal to or greater than the second poisoning amount during the measurement process, and is determined in advance by experiment. This configuration allows for prediction of whether the in-cylinder rich control is performed in the predetermined time period, before the in-cylinder rich control is performed for the purpose of eliminating sulfur poisoning of the $NO_X$ storage reduction catalyst. On prediction that the in-cylinder rich control for the purpose of eliminating sulfur poisoning of the $NO_X$ storage reduction catalyst is performed in the predetermined time period, the configuration of this aspect does not perform the measurement process or stops the measurement process.

In the failure diagnosis device of the emission control system of the above aspect, the exhaust gas purification device may include a selective catalytic reduction catalyst that is configured to adsorb $NH_3$ included in the exhaust gas and reduce $NO_X$ in the exhaust gas using the adsorbed $NH_3$ as a reducing agent, and an $NH_3$ producing catalyst that is placed upstream of the selective catalytic reduction catalyst and is configured to produce $NH_3$ when an air-fuel ratio of the exhaust gas is a rich air-fuel ratio which is lower than the stoichiometric air-fuel ratio. The supplier may perform the in-cylinder rich control to produce $NH_3$ by the NH3 producing catalyst when an $NH_3$ adsorption amount of the selective catalytic reduction catalyst becomes equal to or less than a first $NH_3$ adsorption amount. The controller may predict that the in-cylinder rich control is performed in the predetermined time period when the $NH_3$ adsorption amount of the selective catalytic reduction catalyst is equal to or less than a second $NH_3$ adsorption amount which is larger than the first $NH_3$ adsorption amount, while predicting that the in-cylinder rich control is not performed in the predetermined time period when the $NH_3$ adsorption amount of the selective catalytic reduction catalyst is greater than the second $NH_3$ adsorption amount. The "second $NH_3$ adsorption amount" herein is provided as an $NH_3$ adsorption amount that causes the in-cylinder rich control for the purpose of producing $NH_3$ to be performed in the predetermined time period in the case where the measurement process is performed in the state that the $NH_3$ adsorption amount is equal to or less than the second $NH_3$ adsorption amount or as an $NH_3$ adsorption amount that causes the in-cylinder rich control for the purpose of producing $NH_3$ to be performed in the predetermined time period in the case where the NH$_3$ adsorption amount becomes equal to or less than the second NH$_3$ adsorption amount during the measurement process, and is determined in advance by experiment. This configuration allows for prediction of whether the in-cylinder rich control is performed in the predetermined time period, before the in-cylinder rich control is performed for the purpose of producing NH$_3$. On prediction that the in-cylinder rich control for the purpose of producing NH$_3$ is performed in the predetermined time period, the configuration of this aspect does not perform the measurement process or stops the measurement process.

In the failure diagnosis device of the emission control system that utilizes the electrode-based PM sensor provided downstream of the particulate filter in the exhaust conduit to diagnose a failure of the particulate filter, the above aspects of the disclosure suppress reduction of the accuracy of diagnosis of a failure due to the in-cylinder rich control.

Further features of the present disclosure will become apparent from the following description of exemplary embodiments with reference to the attached drawings.

BRIEF DESCRIPTION OF THE DRAWINGS

FIG. 1 is a diagram illustrating the schematic configuration of an internal combustion engine and its air intake and exhaust system according to a first embodiment of the disclosure;

FIG. 2 is a diagram schematically illustrating the configuration of a PM sensor;

FIG. 3 is diagrams showing variations in output value of a PM sensor after termination of a sensor recovery process;

FIG. 4 is diagrams showing variations in output value of the PM sensor after termination of the sensor recovery process in the case where a particulate filter has a failure;

FIG. 5 is a diagram illustrating a time period when a measurement process is not performed;

FIG. 6 is a flowchart showing a processing routine performed by an ECU to diagnose a failure of the particulate filter according to the first embodiment;

FIG. 7 is a flowchart showing another example of processing routine performed by the ECU to diagnose a failure of the particulate filter according to the first embodiment;

FIG. 8 is a flowchart showing a processing routine performed by the ECU to diagnose a failure of the particulate filter according to a second embodiment;

FIG. 9 is a diagram illustrating the schematic configuration of an internal combustion engine and its air intake and exhaust system according to a third embodiment of the disclosure; and FIG. 10 is a flowchart showing a processing routine performed by the ECU to diagnose a failure of the particulate filter according to the third embodiment.

DESCRIPTION OF EMBODIMENTS

The following describes concrete embodiments with reference to the drawings. The dimensions, the materials, the shapes, the positional relationships and the like of the respective components described in the following embodiments are only for the purpose of illustration and not intended at all to limit the scope of the disclosure to such specific descriptions.

First Embodiment

The following describes a first embodiment with reference to FIGS. 1 to 7. FIG. 1 is a diagram illustrating the schematic configuration of an internal combustion engine 1 and its air intake and exhaust system with which the disclosed embodiments may be applied. The internal combustion engine 1 shown in FIG. 1 is a compression-ignition internal combustion engine (diesel engine) using light oil as fuel. The internal combustion engine 1 may alternatively be a spark ignition internal combustion engine using gasoline or the like as fuel, as long as it is operable using an air-fuel mixture having a lean air-fuel ratio that is higher than the stoichiometric air-fuel ratio.

The internal combustion engine 1 includes a fuel injection valve 3 that is configured to inject the fuel into a cylinder 2. In the case of the internal combustion engine 1 provided as the spark ignition internal combustion engine, the fuel injection valve 3 may be configured to inject the fuel into an air intake port.

The internal combustion engine 1 is connected with an air intake pipe 4. An air flow meter 40 is placed in the middle of the air intake pipe 4 to output an electric signal reflecting the amount (mass) of the intake air (the air) flowing in the air intake pipe 4. An air intake throttle valve 41 is placed downstream of the air flow meter 40 in the air intake pipe 4 to change the passage cross-sectional area of the air intake pipe 4 and thereby regulate the amount of the air taken into the internal combustion engine 1.

The internal combustion engine 1 is connected with an exhaust pipe 5. A catalyst casing 50 is placed in the middle of the exhaust pipe 5. The catalyst casing 50 includes a cylindrical casing filled with an NSR catalyst. The NSR catalyst chemically absorbs or physically adsorbs NO$_X$ included in the exhaust gas when the exhaust gas has a lean air-fuel ratio higher than the stoichiometric air-fuel ratio, while releasing NO$_X$ to accelerate reaction of the released NO$_X$ with a reducing component (for example, a hydrocarbon (HC) or carbon monoxide (CO)) when the exhaust gas has a rich air-fuel ratio lower than the stoichiometric air-fuel ratio. The catalyst casing 50 corresponds to one aspect of the "exhaust gas purification device" of the disclosure. An air-fuel ratio sensor 52 is mounted to the exhaust pipe 5 at a position upstream of the catalyst casing 50 to output an electric signal related to the air-fuel ratio of the exhaust gas flowing in the exhaust pipe 5.

A filter casing 51 is placed downstream of the catalyst casing 50 in the exhaust pipe 5. The filter casing 51 has a particulate filter placed inside of a cylindrical casing. The particulate filter is a wall-flow filter made of a porous base material and serves to trap PM included in the exhaust gas. An exhaust temperature sensor 53 and a PM sensor 54 are placed downstream of the filter casing 51 in the exhaust pipe 5 to output an electric signal related to the temperature of the exhaust gas flowing in the exhaust pipe 5 and output an electric signal related to the PM concentration of the exhaust gas flowing in the exhaust pipe 5, respectively.

The following describes the configuration of the PM sensor 54 with reference to FIG. 2. FIG. 2 is a diagram schematically illustrating the configuration of the PM sensor 54. The PM sensor 54 shown in FIG. 2 is an electrode-based PM sensor. Although the PM sensor 54 shown in FIG. 2 includes a pair of electrodes, the PM sensor may include multiple pairs of electrodes. The PM sensor 54 has a sensor element 543 including a pair of electrodes 541 and 542 that are placed away from each other on a surface of a plate-like insulator 540, an ammeter 544 that is configured to measure the electric current flowing between the electrodes 541 and 542, an electric heater 545 that is placed on a rear face of the sensor element 543, and a cover 546 that is configured to cover the sensor element 543. The cover 546 has a plurality of through holes 547 formed therein.

In the state that the PM sensor 54 having the above configuration is mounted to the exhaust pipe 5, part of the exhaust gas flowing in the exhaust pipe 5 passes through the through holes 547 to flow in the cover 546. When the exhaust gas flows in the cover 546, PM included in the exhaust gas adheres between the electrodes 541 and 542 (i.e., on the insulator 540). PM has electrical conductivity, so that deposition of a predetermined amount of PM between the electrodes 541 and 542 establishes electrical continuity between the electrodes 541 and 542. Applying a predetermined voltage from a power source to the electrodes 541 and 542 causes the electric current to flow between the electrodes 541 and 542 when the electrodes 541 and 542 are electrically when electrical continuity is established between the electrodes 541 and 542.

After the amount of PM depositing between the electrodes 541 and 542 reaches the predetermined amount, the resistance value between the electrodes 541 and 542 decreases with a further increase in amount of PM depositing between the electrodes 541 and 542. Accordingly the value of current flowing between the electrodes 541 and 542 increases with an increase in amount of PM depositing between the electrodes 541 and 542. The amount of PM depositing between the electrodes 541 and 542 is thus detectable by measuring the value of current flowing between the electrodes 541 and 542 with the ammeter 544.

When the amount of PM depositing between the electrodes 541 and 542 is less than the predetermined amount, the electrodes 541 and 542 have no electrical continuity, so that the output of the PM sensor 54 is zero. When the amount of PM depositing between the electrodes 541 and 542 reaches or exceeds the predetermined amount, the electrodes 541 and 542 have electrical continuity, so that the output of the PM sensor 54 becomes higher than zero. After the electrical continuity is established between the electrodes 541 and 542, the output of the PM sensor 54 increases with a further increase in amount of PM depositing between the electrodes 541 and 542. In the description below, the predetermined amount is referred to as "effective deposition amount".

There is a limited space between the electrodes 541 and 542 to allow for deposition of PM. When the amount of PM depositing between the electrodes 541 and 542 (hereinafter referred to as "deposition amount of PM") reaches a predetermined upper limit amount, the electric current is supplied to the heater 545 to increase the temperature of the sensor element 543 and oxidize and remove the PM depositing between the electrodes 541 and 542 (sensor recovery process).

Referring back to FIG. 1, the internal combustion engine 1 is provided with an ECU (electronic control unit) 6 as the processor of disclosed embodiments. The ECU 6 is provided as an electronic control unit including a CPU, a ROM, a RAM and a backup RAM. The ECU 6 may be programmed to perform disclosed functions. The ECU 6 is electrically connected with various sensors including an accelerator position sensor 7 and a crank position sensor 8, in addition to the air flow meter 40, the air-fuel ratio sensor 52, the exhaust temperature sensor 53 and the PM sensor 54 described above. The accelerator position sensor 7 is provided as a sensor that outputs an electric signal related to the operation amount (accelerator position) of an accelerator pedal (not shown). The crank position sensor 8 is provided as a sensor that outputs an electric signal related to the rotational position of an output shaft (crankshaft) of the internal combustion engine 1.

The ECU 6 is also electrically connected with various devices such as the fuel injection valve 3 and the intake air throttle valve 41 described above. The ECU 6 controls the above various devices, based on output signals from the above various sensors. For example, under a condition that the internal combustion engine 1 is operated with combustion of the air-fuel mixture having a lean air-fuel ratio (lean combustion operation), when the $NO_X$ storage amount of the NSR catalyst reaches or exceeds a predefined upper limit amount (first $NO_X$ storage amount), the ECU 6 controls the fuel injection valve 3 to change the air-fuel ratio of the air-fuel mixture subjected to combustion in the cylinder 2 from the lean air-fuel ratio to a rich air-fuel ratio (in-cylinder rich control), so as to reduce and convert $NO_X$ stored in the NSR catalyst (rich spike process). The ECU 6 performing the in-cylinder rich control when the $NO_X$ storage amount of the NSR catalyst becomes equal to or higher than the first $NO_X$ storage amount implements the "supplier" of disclosed embodiments. The ECU 6 performs a failure diagnosis process of the particulate filter which is characteristic of disclosed embodiments, in addition to known processes such as the rich spike process described above. The following describes a procedure of the failure diagnosis process of the particulate filter.

The ECU 6 performs the sensor recovery process to remove the PM depositing between the electrodes 541 and 542 of the PM sensor 54, before performing failure diagnosis of the particulate filter. More specifically, the ECU 6 causes electric current to be supplied from the power source to the heater 545 of the PM sensor 54. Supplying electric current to the heater 545 causes the heater 545 to generate heat and thereby heat the sensor element 543. The ECU 6 controls the value of driving current of the heater 545 to adjust the temperature of the sensor element 543 to a temperature that allows for oxidation of PM. The temperature of the sensor element 543 may be regarded as being approximately equal to the temperature of the heater 545. The ECU 6 accordingly controls the current value to adjust the temperature of the heater 545 to the temperature that allows for oxidation of PM. The temperature of the heater 545 may be calculated from the resistance value of the heater 545.

When the state that the temperature of the sensor element 543 is adjusted to the temperature that allows for oxidation of PM continues for a specified recovery time, the ECU 6 stops the supply of electric current to the heater 545 and terminates the sensor recovery process. The specified recovery time denotes a time duration required for oxidation and removal of the PM depositing between the electrodes 541 and 542 of the PM sensor 54. For example, the specified recovery time may be fixed to a time duration required for oxidation and removal of the predetermined upper limit amount of PM or may be changed according to the actual deposition amount of PM.

After termination of the sensor recovery process, the ECU 6 starts application of the predetermined voltage to the electrodes 541 and 542 of the PM sensor 54. The ECU 6 then reads an output value of the PM sensor 54 at a time when a predetermined time period has elapsed since the start of application of the predetermined voltage (reading timing) and compares the output value with a predefined reference value in order to diagnose a failure of the particulate filter. The combination of the sensor recovery process with the process of applying the predetermined voltage to the electrodes 541 and 542 of the PM sensor 54 after termination of the sensor recovery process and the process of reading the output value of the PM sensor 54 at the reading timing corresponds to the "measurement process" of the disclosure.

When a failure such as breakage or erosion occurs in part of the particulate filter, the PM trapping efficiency of the particulate filter decreases. The amount of PM slipping through the particulate filter per unit time is larger in the case where the particulate filter has a failure than in the case where the particulate filter has no failure.

FIG. 3 is diagrams showing variations in deposition amount of PM in the PM sensor 54 and in output value of the PM sensor 54 when application of the predetermined voltage to the electrodes 541 and 542 of the PM sensor 54 is started after termination of the sensor recovery process. FIG. 3(*a*) shows the elapsed time since the start of application of the predetermined voltage to the electrodes 541 and 542 as abscissa and the deposition amount of PM in the PM sensor 54 as ordinate. FIG. 3(*b*) shows the elapsed time since the start of application of the predetermined voltage to the electrodes 541 and 542 as abscissa and the output value of the PM sensor 54 as ordinate. Solid-line graphs in FIGS. 3(*a*) and 3(*b*) show the deposition amount of PM in the PM sensor 54 and the output value of the PM sensor 54 in the case where the particulate filter has no failure. Dot-and-dash-line graphs in FIGS. 3(*a*) and 3(*b*) show the deposition amount of PM in the PM sensor 54 and the output value of the PM sensor 54 in the case where part of the particulate filter has a failure. The solid-line graphs and the dot-and-dash-line graphs show the results measured under identical conditions other than the presence or the absence of a failure in the particulate filter.

As shown in FIG. 3, immediately after a start of application of the predetermined voltage to the electrodes 541 and 542, in both the case where the particulate filter has a failure and the case where the particulate filter has no failure, the deposition amount of PM in the PM sensor 54 is less than the effective deposition amount, so that the output value of the PM sensor 54 is zero. The amount of PM slipping through the particulate filter per unit time is, however, larger in the case where the particulate filter has a failure than in the case where the particulate filter has no failure. Accordingly, the timing when the deposition amount of PM in the PM sensor 54 reaches the effective deposition amount is earlier in the case where the particulate filter has a failure than in the case where the particulate filter has no failure. As a result, the timing when the output value of the PM sensor 54 starts increasing from zero (hereinafter referred to as "output start timing") is earlier in the case where the particulate filter has a failure (t1 in FIG. 3) than in the case where the particulate filter has no failure (t2 in FIG. 3). Additionally, the increase rate (increase amount per unit time) of the output value after the output start timing is higher in the case where the particulate filter has a failure than in the case where the particulate filter has no failure.

Here attention is focused on a predetermined timing (ts in FIG. 3) that is later than the output start timing t1 in the case where the particulate filter has a failure but is earlier than the output start timing t2 in the case where the particulate filter has no failure. At this predetermined timing ts, the output value of the PM sensor is zero in the case where the particulate filter has no failure, while being equal to or higher than a predefined reference value (Tr in FIG. 3) that is larger than zero in the case where the particulate filter has a failure.

By taking into account the above characteristic, the predetermined time period may be set to make the reading timing equal to the predetermined timing ts. This allows for diagnosis of a failure of the particulate filter by comparing the output value of the PM sensor 54 at the time when the predetermined time period has elapsed since the start of application of the predetermined voltage to the electrodes 541 and 542 of the PM sensor 54 with the predefined reference value Tr.

The predetermined time period denotes a required time duration between the time when application of the predetermined voltage to the electrodes 541 and 542 is started and the time when the deposition amount of PM in the PM sensor 54 becomes equal to or higher than the predefined reference value Tr on the assumption that the particulate filter has a failure. The ECU 6 accordingly assumes that the particulate filter has a failure at the time when application of the predetermined voltage to the electrodes 541 and 542 is started, and starts estimation (computation) of the amount of PM adhering to or depositing in the PM sensor 54. The ECU 6 determines that the predetermined time period has elapsed when the estimated deposition amount of PM reaches a predetermined deposition amount (for example, a deposition amount of PM that makes the output value of the PM sensor 54 equal to or higher than the predefined reference value Tr when part of the particulate filter has a failure). In the case where the output value of the PM sensor 54 is lower than the predefined reference value Tr at the timing when the predetermined time period has elapsed (reading timing ts), the ECU 6 diagnoses that the particulate filter has no failure. In the case where the output value of the PM sensor 54 is equal to or higher than the predefined reference value Tr at the reading timing ts, on the other hand, the CPU 6 diagnoses that the particulate filter has a failure.

The output value of the PM sensor 54 is likely to include a measurement error, due to an initial tolerance of the PM sensor 54 or the like. The estimated deposition amount of PM is likely to include an estimation error. It is accordingly desirable to set the reading timing (predetermined timing) ts and the predefined reference value Tr respectively to a timing and a value that ensure diagnosis of a failure with high accuracy even when the measurement value of the PM sensor 54 includes a measurement error and the estimated deposition amount of PM includes an estimation error. For example, it is desirable to set the predefined reference value Tr to a sufficiently large value relative to the measurement error of the PM sensor 54 and the estimation error of the estimated deposition amount of PM and to set the reading timing ts according to the setting of the predefined reference value Tr.

The estimated deposition amount of PM is estimated by integrating the amount of PM depositing in the PM sensor 54 per unit time on the assumption that the particulate filter has a failure. The amount of PM depositing in the PM sensor 54 per unit time is related to the flow rate of the exhaust gas (flow velocity of the exhaust gas)) flowing out of the particulate filter per unit time, the PM concentration of the exhaust gas flowing out of the particulate filter having a failure, and the difference between the temperature of the exhaust gas flowing out of the particulate filter and the temperature of the sensor element 543. For example, the amount of PM depositing in the PM sensor 54 per unit time increases with a decrease in flow rate of the exhaust gas. The amount of PM depositing in the PM sensor 54 per unit time also increases with an increase in PM concentration of the exhaust gas flowing out of the particulate filter having a failure. Additionally, the amount of PM depositing in the PM sensor 54 per unit time increases with an increase in difference between the temperature of the exhaust gas flowing out of the particulate filter and the temperature of the sensor element 543 (i.e., with an increase in temperature of the exhaust gas relative to the temperature of the sensor element 543). The amount of PM depositing in the PM sensor 54 per unit time may thus be estimated by using, as parameter, the flow rate of the exhaust gas flowing out of the particulate filter per unit time, the PM concentration of the exhaust gas flowing out of the particulate filter on the assumption that the particulate filter has a failure, and the difference between the temperature of the exhaust gas flowing out of the particulate filter (i.e., output value of the exhaust temperature sensor 53) and the temperature of the sensor element 543 (i.e., temperature calculated from the resistance value of the heater 545).

The flow rate of the exhaust gas flowing out of the particulate filter per unit time may be regarded as being equal to the total of the amount of intake air per unit time and the amount of fuel injection per unit time and may thus be calculated by using the output value of the air flow meter 40 and the amount of fuel injection as parameters. The PM concentration of the exhaust gas flowing out of the particulate filter having a failure may be calculated by using, as parameters, the amount of PM discharged from the internal combustion engine 1 per unit time, the ratio of the amount of PM flowing out of the particulate filter having a failure to the amount of PM flowing into the particulate filter having the failure, and the flow rate of the exhaust gas flowing out of the particulate filter per unit time. In the case where the in-cylinder rich control described above is not performed, the PM adhering or depositing between the electrodes 541 and 542 of the PM sensor 54 is mostly soot. It is accordingly preferable to determine the PM concentration of the exhaust gas flowing out of the particulate filter having a failure by using, as parameters, the amount of soot discharged from the internal combustion engine 1 per unit time, the ratio of the amount of soot flowing out of the particulate filter having a failure to the amount of soot flowing into the particulate filter having the failure (hereinafter referred to as "soot slip rate") and the flow rate of the exhaust gas flowing out of the particulate filter per unit time.

The amount of soot discharged from the internal combustion engine 1 per unit time is related to, for example, the amount of intake air, the amount of fuel injection, the temperature and the humidity and may thus be determined by referring to a predetermined map or computation model that uses these relating factors as parameters. The soot slip rate of the particulate filter having a failure is related to the amount of PM trapped by the particulate filter (hereinafter referred to as "trapped amount of PM") and the flow rate of the exhaust gas flowing into the particulate filter per unit time. For example, the soot slip rate increases with an increase in trapped amount of PM by the particulate filter. The soot slip rate also increases with an increase in flow rate of the exhaust gas flowing into the particulate filter per unit time. Accordingly, the soot slip rate of the particulate filter having a failure may be determined by referring to a predetermined map or computation model that uses, as parameters, the trapped amount of PM by the particulate filter and the flow rate of the exhaust gas flowing into the particulate filter per unit time. The trapped amount of PM by the particulate filter may be calculated by using the operation history of the internal combustion engine 1 (for example, the integrated values of the amount of fuel injection and the amount of intake air) as parameters or may be calculated from the output value of a differential pressure sensor (not shown) that is configured to detect a pressure difference before and after the particulate filter.

Intensive experiments and examinations have resulted in obtaining the finding that the output value of the PM sensor 54 at the reading timing ts is lower in the case where the in-cylinder rich control described above is performed in a time period between the start of application of the predetermined voltage to the electrodes 541 and 542 and the reading timing ts (i.e., in the predetermined time period) than in the case where the in-cylinder rich control is not performed.

FIG. 4 is diagrams showing variations in deposition amount of PM and in output value of the PM sensor 54 in the case where the particulate filter has a failure. FIG. 4(a) shows the elapsed time since the start of application of the predetermined voltage to the electrodes 541 and 542 as abscissa and the deposition amount of PM in the PM sensor 54 as ordinate. FIG. 4(b) shows the elapsed time since the start of application of the predetermined voltage to the electrodes 541 and 542 as abscissa and the output value of the PM sensor 54 when the particulate filter has a failure as ordinate. A solid-line graph in FIG. 4(b) shows the output value of the PM sensor 54 when the in-cylinder rich control is performed in at least part of the predetermined time period. A dot-and-dash-line graph in FIG. 4(b) shows the output value of the PM sensor 54 when the in-cylinder rich control is not performed in the predetermined time period. The solid-line graph and the dot-and-dash-line graph in FIG. 4(b) show the results measured under identical conditions other than execution or non-execution of the in-cylinder rich control.

As shown in FIG. 4, the case where the in-cylinder rich control is performed in the predetermined time period and the case where the in-cylinder rich control is not performed in the predetermined time period have substantially similar output start timing of the PM sensor 54 (t3 in FIG. 4) but have different output values of the PM sensor 54 after the output start timing. More specifically, the output value of the PM sensor 54 is lower in the case where the in-cylinder rich control is performed in the predetermined time period than in the case where the in-cylinder rich control is not performed in the predetermined time period. Accordingly, the output value of the PM sensor 54 at the reading timing ts is lower in the case where the in-cylinder rich control is performed (Cpm2 in FIG. 4(b)) than in the case where the in-cylinder rich control is not performed (Cmp1 in FIG. 4(b)).

The mechanism of the phenomenon shown in FIG. 4 is not clearly elucidated but is estimated as follows. The stronger linkage of SOF with soot included in the exhaust gas of the internal combustion engine 1 is expected in the case where the in-cylinder rich control is performed than in the case where the in-cylinder rich control is not performed. Accordingly, when the in-cylinder rich control is not performed, SOF is expected to hardly adhere and deposit between the electrodes 541 and 542 of the PM sensor 54, while only soot is expected to adhere and deposit between the electrodes 541 and 542 of the PM sensor 54. When the in-cylinder rich control is performed, on the other hand, SOF as well as soot is expected to adhere and deposit between the electrodes 541 and 542 of the PM sensor 54. The electrical conductivity of SOF is lower than the electrical conductivity of soot. It is accordingly expected to increase the electric resistance between the electrodes 541 and 542 and thereby decrease the output value of the PM sensor 54 in the case where SOF deposits between the electrodes 541 and 542 of the PM sensor 54, compared with the case where SOF hardly deposits. In other words, in the case where PM including SOF deposits between the electrodes 541 and 542, the value of current flowing between the electrodes 541 and 542 is expected to be lower than the current value corresponding to the actual deposition amount of PM.

When the in-cylinder rich control is performed in at least part of the predetermined time period, SOF deposits between the electrodes 541 and 542 of the PM sensor 54. As shown by the solid-line graph in FIG. 4(b), the output value Cpm2 of the PM sensor 54 at the reading timing ts is likely to be lower than the predefined reference value Tr. This may lead to an incorrect diagnosis that the particulate filter that actually has a failure is diagnosed to have no failure.

In order to avoid such incorrect diagnosis due to the deposition of SOF described above, the procedure of this embodiment predicts whether the in-cylinder rich control is performed in the predetermined time period, in response to a request for performing the measurement process (i.e., before the measurement process). When it is predicted that the in-cylinder rich control is performed in the predetermined time period, the procedure of this embodiment does not perform the measurement process. More specifically, when the $NO_X$ storage amount of the NSR catalyst is less than a second $NO_X$ storage amount that is smaller than the first $NO_X$ storage amount at the time of a request for performing the measurement process, the ECU 6 predicts that the in-cylinder rich control is not performed in the predetermined time period. When the $NO_X$ storage amount of the NSR catalyst is equal to or greater than the second $NO_X$ storage amount at the time of a request for performing the measurement process, on the other hand, the ECU 6 predicts that the in-cylinder rich control is performed in the predetermined time period. The "second $NO_X$ storage amount" is provided as a $NO_X$ storage amount that causes in-cylinder rich control (rich spike process) for the purpose of reducing $NO_X$ stored in the $NO_X$ storage reduction catalyst (NSR catalyst) to be performed in the predetermined time period in the case where the measurement process is performed in the state that the $NO_X$ storage amount of the NSR catalyst is equal to or greater than the second $NO_X$ storage amount, and may be determined in advance by a fitting operation based on an experiment or the like.

As shown in FIG. 5, upon a request for performing the measurement process during a time period when the $NO_X$ storage amount of the NSR catalyst is equal to or greater than the second $NO_X$ storage amount (time period between t1 and t2 in FIG. 5), the above procedure predicts that the in-cylinder rich control is performed in the predetermined time period. Accordingly, the measurement process is not performed during this time period. This results in reducing an incorrect diagnosis that the particulate filter that actually has a failure is diagnosed to have no failure. The aspect that "the measurement process is not performed" includes at least one of an aspect that the sensor recovery process is not performed, an aspect that the predetermined voltage is not applied to the electrodes 541 and 542 (or a voltage lower than the predetermined voltage is applied), an aspect that estimation of the deposition amount of PM in the PM sensor 54 is not performed, an aspect that the output value of the PM sensor 54 at the reading timing ts is not read, and an aspect that comparison between the output value of the PM sensor 54 at the reading timing ts and the predefined reference value Tr is not performed. In terms of minimizing power consumption involved in the measurement process, the procedure may not perform the sensor recovery process and also may not perform application of the predetermined voltage to the electrodes 541 and 542.

The following describes a procedure of failure diagnosis process according to this embodiment with reference to FIG. 6. FIG. 6 is a flowchart showing a processing routine performed by the ECU 6 to diagnose a failure of the particulate filter. This processing routine is stored in advance in the ROM of the ECU 6 and is repeatedly performed at predetermined time intervals during operation of the internal combustion engine 1. This processing routine is performed on the premise that the internal combustion engine 1 and the PM sensor 54 are operated normally.

In the processing routine of FIG. 6, the ECU 6 first determines whether a failure detection flag is equal to value "0" at S101. The failure detection flag denotes a storage area provided in advance in, for example, the backup RAM of the ECU 6 and is set to "0" upon determination that the particulate filter is normal in this processing routine, while being set to "1" upon determination that the particulate filter has a failure in this processing routine. In the case of a negative answer at S101, the ECU 6 terminates this processing routine. In the case of an affirmative answer at S101, on the other hand, the ECU 6 proceeds to S102.

At S102, the ECU 6 determines whether conditions of the measurement process (measurement conditions) are satisfied. More specifically, the ECU 6 determines that the measurement conditions are satisfied upon satisfaction of specified conditions, for example, that the measurement process is not performed at the current moment, that the in-cylinder rich control is not performed at the current moment and that electric power required for the sensor recovery process is obtainable (i.e., the state of charge of a battery or the amount of power generation by a generator exceeds the amount of electric power required for the sensor recovery process). In the case of a negative answer at S102, the ECU 6 determines that there is no request for performing the measurement process and terminates this processing routine. In the case of an affirmative answer at S102, on the other hand, the ECU 6 determines that there is a request for performing the measurement process and proceeds to S103.

At S103, the ECU 6 determines whether the $NO_X$ storage amount of the NSR catalyst (Anox in FIG. 6) is less than the second $NO_X$ storage amount (Anox2 in FIG. 6). The $NO_X$ storage amount Anox of the NSR catalyst is determined by another processing routine and is stored in a specified storage area in the backup RAM. The $NO_X$ storage amount Anox may be estimated and computed based on the operation history of the internal combustion engine 1 (for example, the amount of intake air and the amount of fuel injection) or may be calculated from the measurement values of $NO_X$ sensors provided before and after the catalyst casing 50. In the case of a negative answer at S103, it is predicted that the in-cylinder rich control is performed in the predetermined time period. The ECU 6 accordingly terminates this processing routine without performing the measurement process. In the case of a negative answer at S103, the measurement process may be performed after termination of the in-cylinder rich control. There is, however, a possibility that the exhaust gas of a rich air-fuel ratio produced during the in-cylinder rich control remains in the exhaust pipe 5 upstream of the filter casing 51 immediately after termination of the in-cylinder rich control. It is accordingly desirable to perform the measurement process after the exhaust gas of the rich air-fuel ratio produced during the in-cylinder rich control is purged from the exhaust pipe 5 upstream of the filter casing 51. In the case of an affirmative answer at S103, on the other hand, it is predicted that the in-cylinder rich control is not performed in the predetermined time period. The ECU 6 accordingly performs the measurement process by the processing of S104 to S109. The condition that the $NO_X$ storage amount Anox of the NSR catalyst is less than the second $NO_X$ storage amount Anox2 may be included in the measurement conditions at the processing of S102 described above. In this case, when the $NO_X$ storage amount Anox of the NSR catalyst is equal to or greater than the second $NO_X$ storage amount Anox2, it is predicted that in-cylinder rich control is performed in the predetermined time period. This means that the measurement conditions are not satisfied. As a result, the measurement process is not performed.

At S104, the ECU 6 supplies the electric current to the heater 545 of the PM sensor 54, so as to perform the sensor recovery process. At S105, the ECU 6 subsequently determines whether the execution time of the sensor recovery process is equal to or longer than the specified recovery time. In the case of a negative answer at S105, the ECU 6 returns to S104 to continue the sensor recovery process. In the case of an affirmative answer at S105, on the other hand, the ECU 6 proceeds to S106 to stop the supply of electric current to the heater 545 and terminates the sensor recovery process. After terminating the sensor recovery process at S106, the ECU 6 proceeds to S107.

At S107, the ECU 6 applies the predetermined voltage to the electrodes 541 and 542 of the PM sensor 54. Immediately after termination of the sensor recovery process, the sensor element 543 is in a high temperature atmosphere, so that there is a possibility that PM flowing in between the electrodes 541 and 542 does not deposit but is oxidized. Accordingly, it is desirable that the ECU 6 starts application of the predetermined voltage to the electrodes 541 and 542 when the temperature of the sensor element 543 decreases to a temperature range where PM is not oxidized. When application of the predetermined voltage to the electrodes 541 and 542 is started immediately after termination of the sensor recovery process, the predetermined time period described later may be set to include a time duration required for decreasing the temperature of the sensor element 543 to the temperature range where PM is not oxidized.

At S108, the ECU 6 computes an elapsed time from the start of application of the predetermined voltage to the electrodes 541 and 542 to the current moment and determines whether the elapsed time is equal to or longer than the predetermined time period. As described above, the predetermined time period denotes a required time duration between the time when application of the predetermined voltage to the electrodes 541 and 542 is started and the time when the deposition amount of PM in the PM sensor 54 becomes equal to or higher than the predetermined deposition amount on the assumption that the particulate filter has a failure. In the case of a negative answer at S108, the ECU 6 returns to S107. In the case of an affirmative answer at S108, on the other hand, the ECU 6 proceeds to S109.

At S109, the ECU 6 reads the output value of the PM sensor 54 (Cpm in FIG. 6). The output value Cpm read at S109 is the output value of the PM sensor 54 when the predetermined time period has elapsed since the start of application of the predetermined voltage to the electrodes 541 and 542 and corresponds to the output value of the PM sensor 54 at the predetermined timing (reading timing) ts described above with reference to FIG. 3.

On completion of the processing at S109, the ECU 6 diagnoses a failure of the particulate filter by the processing of S110 to S112. At S110, the ECU 6 determines whether the output value Cpm read at S109 is lower than the predefined reference value Tr. In the case of an affirmative answer at S110 (Cpm<Tr), the ECU 6 proceeds to S111 to determine that the particulate filter is normal (has no failure) and stores "0" in the failure detection flag. In the case of a negative answer at S110 (Cpm≥Tr), on the other hand, the ECU 6 proceeds to S112 to determine that the particulate filter has a failure and stores "1" in the failure detection flag. Upon determination that the particulate filter has a failure at S112, the ECU 6 may store failure information of the particulate filter in the backup RAM or the like and may turn on a malfunction indication lamp (MIL) provided in the vehicle interior.

As a result, the procedure of this embodiment does not perform the measurement process on prediction that the in-cylinder rich control for the purpose of reducing $NO_X$ stored in the NSR catalyst is performed in the predetermined time period. This reduces an incorrect diagnosis that the particulate filter that actually has a failure is diagnosed to have no failure. This also suppresses an increase in power consumption involved in the unnecessary measurement process.

Intensive experiments and examinations have resulted in obtaining the finding that the case where rich spike process is performed by a method of adding fuel to the exhaust gas (hereinafter referred to as "addition control") and the case where the rich spike process is not performed have substantially equivalent output values of the PM sensor 54 at the reading timing ts, as well as the finding that the output value of the PM sensor 54 after elapse of the predetermined time period is lower in the case where the in-cylinder rich control is performed in the predetermined time period than in the case where the in-cylinder rich control is not performed. Accordingly, as in the case where the rich spike process by the in-cylinder rich control is not performed in the predetermined time period, in the case where the rich spike process by the addition control is performed in the predetermined time period, diagnosis of a failure of the particulate filter may be performed. In this case, diagnosis of a failure may be performed with equivalent accuracy to that in the case where the rich spike process by the in-cylinder rich control is not performed.

In the case of prediction that the in-cylinder rich control is not performed in the predetermined time period, continuous operation of the internal combustion engine 1 that increases the amount of $NO_X$ discharged from the internal combustion engine 1 may result in increasing the $NO_X$ storage amount of the NSR catalyst to or above the first $NO_X$ storage amount in the predetermined time period. In this case, the measurement process may be stopped at the time when the in-cylinder rich control is performed. This may, however, lead to the possibility that a large amount of electric power is consumed between the start and the stop of the measurement process. A modified procedure may thus predict whether the in-cylinder rich control is performed in the predetermined time period during the measurement process in addition to before the measurement process and stop the measurement process on prediction that the in-cylinder rich control is performed in the predetermined time period. In this case, the ECU 6 may diagnose a failure of the particulate filter according to a processing routine shown in FIG. 7. The like steps to those of the processing routine of FIG. 6 are expressed by the like step numbers in FIG. 7.

In the processing routine of FIG. 7, the ECU 6 proceeds to S201 in the case of a negative answer at S108. At S201, the ECU 6 reads the $NO_X$ storage amount of the NSR catalyst again and determines whether the $NO_X$ storage amount is less than a second $NO_X$ storage amount Anox2'. The second $NO_X$ storage amount Anox2' used at S201 is larger than the second $NO_X$ storage amount Anox2 used at S103. For example, the second $NO_X$ storage amount Anox2' used at S201 may be the sum of a correction value according to the elapsed time from the start of the measurement process to the current moment and the second $NO_X$ storage amount Anox2 used at S103. The correction value is set to increase with an increase in elapsed time since the start of the measurement process to the current moment.

In the case of an affirmative answer at S201, it is predicted that the in-cylinder rich control is not performed in the predetermined time period. The ECU 6 then returns to S107. In the case of a negative answer at S201, on the other hand, it is predicted that the in-cylinder rich control is performed in the predetermined time period. The ECU 6 then proceeds to S203 to stop the measurement process. The aspect that the "measurement process is stopped" includes an aspect that the measurement process is terminated and an aspect that the measurement process is interrupted until completion of the in-cylinder rich control and is restarted after completion of the in-cylinder rich control. In the case where the measurement process is interrupted until completion of the in-cylinder rich control, the PM depositing between the electrodes 541 and 542 in a time period before interruption of the measurement process needs to be held until completion of the in-cylinder rich control. Accordingly, in the case where the measurement process is interrupted until completion of the in-cylinder rich control, a voltage lower than the predetermined voltage is continuously applied to the electrodes 541 and 542. The voltage applied to the electrodes 541 and 542 in this case is adjusted to a magnitude that holds the PM previously depositing between the electrodes 541 and 542 but that prevents PM from newly depositing between the electrodes 541 and 542.

In the case where diagnosis of a failure of the particulate filter is performed according to the processing routine of FIG. 7, the process of predicting whether the in-cylinder rich control is performed in the predetermined time period is performed during the measurement process, in addition to upon a request for performing the measurement process. Even when the measurement process has already been started at the time of prediction that the in-cylinder rich control is performed in the predetermined time period, this allows the measurement process to be stopped at the time of prediction. This more effectively reduces an incorrect diagnosis that the particulate filter that actually has a failure is diagnosed to have no failure. This also reduces the electric power consumed between the start and the stop of the measurement process when the measurement process has already been started at the time of prediction that the in-cylinder rich control is performed in the predetermined time period. In terms of reducing the incorrect diagnosis described above, the process of predicting whether the in-cylinder rich control is performed in the predetermined time period may be performed only during the measurement process. This modification reduces the incorrect diagnosis described above and additionally reduces the electric power consumed between the start and the stop of the measurement process compared with the method of stopping the measurement process at the time when the in-cylinder rich control is actually performed.

Second Embodiment

The following describes a second embodiment of the disclosure with reference to FIG. 8. The following describes only a configuration different from the first embodiment described above and does not specifically describe the similar configuration. The second embodiment differs from the first embodiment described above by that the measurement process is not performed on prediction that in-cylinder rich control for the purpose of eliminating sulfur poisoning of the NSR catalyst is performed in the predetermined time period.

The NSR catalyst placed in the catalyst casing 50 stores sulfur compounds ($SO_X$) included in the exhaust gas, in addition to $NO_X$ included in the exhaust gas. The $NO_X$ storage capacity of the NSR catalyst decreases with an increase in amount of $SO_X$ stored in the NSR catalyst. There is accordingly a need to perform a process of removing $SO_X$ stored in the NSR catalyst when the amount of $SO_X$ stored in the NSR catalyst (sulfur poisoning amount) reaches or exceeds a predetermined upper limit amount (first sulfur poisoning amount). For removal of $SO_X$ stored in the NSR catalyst, the NSR catalyst should be at high-temperature and in a rich atmosphere. The ECU 6 accordingly performs in-cylinder rich control when the sulfur poisoning amount of the NSR catalyst reaches or exceeds the first sulfur poisoning amount. This increases the temperature of the NSR catalyst with the heat of oxidation reaction of the fuel included in the exhaust gas and controls the atmosphere of the NSR catalyst to the rich atmosphere. As in the case where the in-cylinder rich control for the purpose of reducing $NO_X$ stored in the NSR catalyst is performed in the predetermined time period, performing such in-cylinder rich control in the predetermined time period may lead to an inaccurate diagnosis of a failure of the particulate filter.

The procedure of this embodiment accordingly predicts whether the in-cylinder rich control for the purpose of eliminating sulfur poisoning of the NSR catalyst is performed in the predetermined time period, upon a request for performing the measurement process. When it is predicted that the in-cylinder rich control for the purpose of eliminating sulfur poisoning of the NSR catalyst is performed in the predetermined time period, the procedure of this embodiment does not perform the measurement process. More specifically, when the sulfur poisoning amount of the NSR catalyst is less than a second sulfur poisoning amount that is smaller than the first sulfur poisoning amount, the ECU 6 predicts that the in-cylinder rich control is not performed in the predetermined time period. When the sulfur poisoning amount of the NSR catalyst is equal to or greater than the second sulfur poisoning amount, on the other hand, the ECU 6 predicts that the in-cylinder rich control is performed in the predetermined time period. The "second sulfur poisoning amount" is provided as a sulfur poisoning amount that causes in-cylinder rich control for the purpose of eliminating sulfur poisoning of the $NO_X$ storage reduction catalyst (NSR catalyst) to be performed in the predetermined time period in the case where the measurement process is performed in the state that the sulfur poisoning amount of the NSR catalyst is equal to or greater than the second sulfur poisoning amount, and may be determined in advance by a fitting operation based on an experiment or the like.

The following describes a procedure of failure diagnosis process according to this embodiment with reference to FIG. 8. FIG. 8 is a flowchart showing a processing routine performed by the ECU 6 to diagnose a failure of the particulate filter. The like steps to those of the processing routine of FIG. 6 are expressed by the like step numbers in FIG. 8.

In the processing routine of FIG. 8, in the case of an affirmative answer at S102, the ECU 6 performs the processing of S301 instead of the processing of S103. At S301, the ECU 6 determines whether the sulfur poisoning amount of the NSR catalyst (Asox in FIG. 8) is less than the second sulfur poisoning amount (Asox2 in FIG. 8). The sulfur poisoning amount of the NSR catalyst may be estimated based on the operation history of the internal combustion engine 1 (for example, the integrated values of the amount of fuel injection and the amount of intake air) or may be calculated from the measurement value of a $SO_X$ sensor provided upstream of the catalyst casing 50.

In the case of an affirmative answer at S301, it is predicted that the in-cylinder rich control for the purpose of eliminating sulfur poisoning of the NSR catalyst is not performed in the predetermined time period. The ECU 6 accordingly performs the processing of and after S104. In the case of a negative answer at S301, on the other hand, it is predicted that the in-cylinder rich control for the purpose of eliminating sulfur poisoning of the NSR catalyst is performed in the predetermined time period. The ECU 6 accordingly terminates this processing routine without performing the measurement process. In this case, the measurement process may be performed after the in-cylinder rich control for the purpose of eliminating sulfur poisoning of the NSR catalyst is terminated and after the exhaust gas of the rich air-fuel ratio produced during the in-cylinder rich control is purged from the exhaust pipe 5 upstream of the filter casing 51.

The procedure of this embodiment does not perform the measurement process on prediction that the in-cylinder rich control for the purpose of eliminating sulfur poisoning of the NSR catalyst is performed in the predetermined time period. This reduces an incorrect diagnosis that the particulate filter that actually has a failure is diagnosed to have no failure. This also suppresses an increase in power consumption involved in the unnecessary measurement process.

The prediction of whether the in-cylinder rich control for the purpose of eliminating sulfur poisoning of the NSR catalyst is performed in the predetermined time period may be performed during the measurement process, in addition to upon a request for performing the measurement process. Even when the measurement process has already been started at the time of prediction that the in-cylinder rich control for the purpose of eliminating sulfur poisoning of the NSR catalyst is performed in the predetermined time period, this allows the measurement process to be stopped at the time of prediction. This more effectively reduces an incorrect diagnosis that the particulate filter that actually has a failure is diagnosed to have no failure and more effectively reduces the power consumption involved in the measurement process. According to a modification, the prediction of whether the in-cylinder rich control is performed in the predetermined time period may be performed only during the measurement process. This modification reduces the incorrect diagnosis described above and additionally reduces the electric power consumed between the start and the stop of the measurement process compared with the method of stopping the measurement process at the time when the in-cylinder rich control for the purpose of eliminating sulfur poisoning of the NSR catalyst is actually performed.

The configuration of this embodiment may be combined with the configuration of the first embodiment described above. According to this modification, upon satisfaction of at least one of the conditions that the $NO_X$ storage amount of the NSR catalyst is equal to or greater than the second $NO_X$ storage amount and that the sulfur poisoning amount of the NSR catalyst is equal to or greater than the second sulfur poisoning amount, the ECU 6 may predict that the in-cylinder rich control is performed in the predetermined time period and may not perform the measurement process or may stop the measurement process. This modified configuration ensures diagnosis of a failure of the particulate filter with higher accuracy and more effectively reduces the power consumption involved in the measurement process.

Third Embodiment

The following describes a third embodiment of the disclosure with reference to FIGS. 9 and 10. The following describes only a configuration different from the first embodiment described above and does not specifically describe the similar configuration. The third embodiment differs from the first embodiment described above by that the measurement process is not performed on prediction that in-cylinder rich control for the purpose of supplying $NH_3$ to a selective catalytic reduction (SCR) catalyst placed downstream of the NSR catalyst is performed in the predetermined time period.

FIG. 9 is a diagram illustrating the schematic configuration of an internal combustion engine and its air intake and exhaust system which disclosed embodiments are applied. The like components to those of FIG. 1 described above are expressed by the like numerical symbols in FIG. 9. As shown in FIG. 9, a catalyst casing 55 is placed between the catalyst casing 50 and the filter casing 51 in the exhaust pipe 5. This catalyst casing 55 includes a cylindrical casing filled with the SCR catalyst. The SCR catalyst serves to adsorb $NH_3$ included in the exhaust gas and reduce $NO_X$ in the exhaust gas using the adsorbed $NH_3$ as a reducing agent.

In the emission control system having this configuration, when an $NH_3$ adsorption amount of the SCR catalyst becomes equal to or less than a predetermined reduction amount (first $NH_3$ adsorption amount), the ECU 6 performs in-cylinder rich control for the purpose of producing $NH_3$ by the NSR catalyst. When the in-cylinder rich control is performed, $NO_X$ stored in the NSR catalyst of the catalyst casing 50 is reduced to produce NH3. $NH_3$ produced in the NSR catalyst flows, along with the exhaust gas, into the catalyst casing 55 and is adsorbed to the SCR catalyst. As in the case where the in-cylinder rich control for the purpose of reducing $NO_X$ stored in the NSR catalyst is performed, performing the in-cylinder rich control for the purpose of producing $NH_3$ in the predetermined time period may lead to an inaccurate diagnosis of a failure of the particulate filter.

The procedure of this embodiment accordingly predicts whether in-cylinder rich control for the purpose of producing $NH_3$ is performed in the predetermined time period, upon a request for performing the measurement process. When it is predicted that the in-cylinder rich control for the purpose of producing $NH_3$ is performed in the predetermined time period, the procedure of this embodiment does not perform the measurement process. More specifically, when the $NH_3$ adsorption amount of the SCR catalyst is greater than a second $NH_3$ adsorption amount that is larger than the first $NH_3$ adsorption amount, the ECU 6 predicts that the in-cylinder rich control for the purpose of producing $NH_3$ is not performed in the predetermined time period. When the $NH_3$ adsorption amount of the SCR catalyst is equal to or less than the second $NH_3$ adsorption amount, on the other hand, the ECU 6 predicts that the in-cylinder rich control for the purpose of producing $NH_3$ is performed in the predetermined time period. The "second $NH_3$ adsorption amount" is provided as an $NH_3$ adsorption amount that causes in-cylinder rich control for the purpose of producing $NH_3$ to be performed in the predetermined time period in the case where the measurement process is performed in the state that the $NH_3$ adsorption amount of the SCR catalyst is equal to or less than the second NH$_3$ adsorption amount, and may be determined in advance by a fitting operation based on an experiment or the like.

The following describes a procedure of failure diagnosis process according to this embodiment with reference to FIG. 10. FIG. 10 is a flowchart showing a processing routine performed by the ECU 6 to diagnose a failure of the particulate filter. The like steps to those of the processing routine of FIG. 6 are expressed by the like step numbers in FIG. 10.

In the processing routine of FIG. 10, in the case of an affirmative answer at S102, the ECU 6 performs the processing of S401 instead of the processing of S103. At S401, the ECU 6 determines whether the NH$_3$ adsorption amount of the SCR catalyst (Anh in FIG. 10) is greater than the second NH$_3$ adsorption amount (Anh2 in FIG. 10). The NH$_3$ adsorption amount of the SCR catalyst may be determined by computing a balance between the amount of NH$_3$ consumed by, for example, reduction of NO$_X$ by the SCR catalyst and the amount of NH$_3$ produced by the NSR catalyst.

In the case of an affirmative answer at S401, it is predicted that the in-cylinder rich control for the purpose of producing NH$_3$ is not performed in the predetermined time period. The ECU 6 accordingly performs the processing of and after S104. In the case of a negative answer at S401, on the other hand, it is predicted that the in-cylinder rich control for the purpose of producing NH$_3$ is performed in the predetermined time period. The ECU 6 accordingly terminates this processing routine without performing the measurement process. In this case, the measurement process may be performed after the in-cylinder rich control for the purpose of producing NH$_3$ is terminated and after the exhaust gas of the rich air-fuel ratio produced during the in-cylinder rich control is purged from the exhaust pipe 5 upstream of the filter casing 51.

The procedure of this embodiment does not perform the measurement process on prediction that the in-cylinder rich control for the purpose of producing NH$_3$ is performed in the predetermined time period. This reduces an incorrect diagnosis that the particulate filter that actually has a failure is diagnosed to have no failure. This also suppresses an increase in power consumption involved in the unnecessary measurement process.

The prediction of whether the in-cylinder rich control for the purpose of producing NH$_3$ is performed in the predetermined time period may be performed during the measurement process, in addition to upon a request for performing the measurement process. Even when the measurement process has already been started at the time of prediction that the in-cylinder rich control for the purpose of producing NH$_3$ is performed in the predetermined time period, this allows the measurement process to be stopped at the time of prediction. This more effectively reduces an incorrect diagnosis that the particulate filter that actually has a failure is diagnosed to have no failure and more effectively reduces the power consumption involved in the measurement process. According to a modification, the prediction of whether the in-cylinder rich control is performed in the predetermined time period may be performed only during the measurement process. This modification reduces the incorrect diagnosis described above and additionally reduces the electric power consumed between the start and the stop of the measurement process compared with the method of stopping the measurement process at the time when the in-cylinder rich control for the purpose of producing NH$_3$ is actually performed.

The failure diagnosis process described in this embodiment is also applicable to the case where a three-way catalyst, instead of the NSR catalyst, is placed in the catalyst casing 50. In this modified configuration, when the NH$_3$ adsorption amount of the SCR catalyst becomes equal to or less than the first NH$_3$ adsorption amount, in-cylinder rich control is performed for the purpose of producing NH$_3$ by the three-way catalyst.

In the configuration of FIG. 9, there is a possibility that the in-cylinder rich control for the purpose of reducing NO$_X$ stored in the NSR catalyst and the in-cylinder rich control for the purpose of eliminating sulfur poisoning of the NSR catalyst are performed in the predetermined time period, in addition to the in-cylinder rich control for the purpose of producing NH$_3$. Accordingly, the ECU 6 may determine whether at least one of the conditions that the NH3 adsorption amount of the SCR catalyst is equal to or less than the second NH3 adsorption amount, that the NO$_X$ storage amount of the NSR catalyst is equal to or greater than the second NO$_X$ storage amount and that the sulfur poisoning amount of the NSR catalyst is equal to or greater than the second sulfur poisoning amount is satisfied and may not perform the measurement process upon satisfaction of at least one of the conditions. This prediction process may be performed during the measurement process, in addition to before the measurement process. This modified configuration ensures diagnosis of a failure of the particulate filter with higher accuracy and more effectively reduces the power consumption involved in the measurement process.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

REFERENCE SIGNS LIST 1 internal combustion engine
2 cylinder
3 fuel injection valve
4 air intake pipe
5 exhaust pipe
6 ECU
40 air flow meter
50 catalyst casing
51 filter casing
52 air-fuel ratio sensor
53 exhaust temperature sensor
54 PM sensor
55 catalyst casing
540 insulator
541 electrode
543 sensor element
544 ammeter
545 heater
546 cover
547 through holes

What is claimed is:

1. A failure diagnosis device for an emission control system, wherein the emission control system includes a particulate filter that is placed in an exhaust conduit of an internal combustion engine and that is configured to trap PM in exhaust gas; an exhaust gas purification device that is placed upstream of the particulate filter in the exhaust conduit and that is configured to purify the exhaust gas by utilizing a non-combusted fuel component included in the exhaust gas; and a supplier that is configured to perform in-cylinder rich control of changing an air-fuel ratio of an air-fuel mixture subjected to combustion in the internal combustion engine to a rich air-fuel ratio which is lower than a stoichiometric air-fuel ratio, so as to supply the non-combusted fuel component to the exhaust gas purification device, the failure diagnosis device comprising:
a PM sensor that is provided to detect an amount of PM flowing out of the particulate filter, the PM sensor including electrodes opposed to each other across an insulating layer and being configured to output an electric signal relating to a value of electric current flowing between the electrodes under application of a predetermined voltage to the electrodes; and
a controller comprising at least one processor configured to perform a process of diagnosing a failure of the particulate filter, based on an output value of the PM sensor, wherein
the controller is programmed to:
perform a measurement process, the measurement process including a sensor recovery process of removing PM depositing between the electrodes of the PM sensor, a process of starting application of the predetermined voltage to the electrodes of the PM sensor after completion of the sensor recovery process, and a process of obtaining an output value of the PM sensor after elapse of a predetermined time period since the start of application of the predetermined voltage;
diagnose a failure of the particulate filter by comparing the obtained output value of the PM sensor with a predefined reference value;
predict whether the in-cylinder rich control is performed in the predetermined time period, before the measurement process, or during the measurement process, or both before and during the measurement process; and
perform the measurement process or continue the measurement process when it is predicted that the in-cylinder rich control is not performed in the predetermined time period, and either do not perform the measurement process or stop the measurement process when it is predicted that the in-cylinder rich control is performed in the predetermined time period.

2. The failure diagnosis device of the emission control system according to claim 1, wherein
the exhaust gas purification device includes an $NO_X$ storage reduction catalyst that is configured to store $NO_X$ from the exhaust gas when an air-fuel ratio of the exhaust gas is a lean air-fuel ratio higher than the stoichiometric air-fuel ratio and to reduce $NO_X$ stored in the $NO_X$ storage reduction catalyst when the air-fuel ratio of the exhaust gas is a rich air-fuel ratio lower than the stoichiometric air-fuel ratio,
the supplier performs the in-cylinder rich control to reduce $NO_X$ stored in the $NO_X$ storage reduction catalyst, when a $NO_X$ storage amount of the $NO_X$ storage reduction catalyst becomes equal to or greater than a first $NO_X$ storage amount, and
the controller is further programmed to predict that the in-cylinder rich control is performed in the predetermined time period when the $NO_X$ storage amount of the $NO_X$ storage reduction catalyst is equal to or greater than a second $NO_X$ storage amount which is smaller than the first $NO_X$ storage amount, while predicting that the in-cylinder rich control is not performed in the predetermined time period when the $NO_X$ storage amount of the $NO_X$ storage reduction catalyst is less than the second $NO_X$ storage amount.

3. The failure diagnosis device of the emission control system according to claim 1, wherein
the exhaust gas purification device includes an $NO_X$ storage reduction catalyst that is configured to store $NO_X$ from the exhaust gas when an air-fuel ratio of the exhaust gas is a lean air-fuel ratio higher than the stoichiometric air-fuel ratio and to reduce $NO_X$ stored in the $NO_X$ storage reduction catalyst when the air-fuel ratio of the exhaust gas is a rich air-fuel ratio lower than the stoichiometric air-fuel ratio,
the supplier performs the in-cylinder rich control to remove a sulfur component from the $NO_X$ storage reduction catalyst when a sulfur poisoning amount of the $NO_X$ storage reduction catalyst becomes equal to or greater than a first poisoning amount, and
the controller is further programmed to predict that the in-cylinder rich control is performed in the predetermined time period when the sulfur poisoning amount of the $NO_X$ storage reduction catalyst is equal to or greater than a second poisoning amount which is smaller than the first poisoning amount, while predicting that the in-cylinder rich control is not performed in the predetermined time period when the sulfur poisoning amount of the $NO_X$ storage reduction catalyst is less than the second poisoning amount.

4. The failure diagnosis device of the emission control system according to claim 1, wherein
the exhaust gas purification device includes a selective catalytic reduction catalyst that is configured to adsorb $NH_3$ included in the exhaust gas and to reduce $NO_X$ from the exhaust gas using the adsorbed $NH_3$ as a reducing agent, and an $NH_3$ producing catalyst that is placed upstream of the selective catalytic reduction catalyst and is configured to produce $NH_3$ when an air-fuel ratio of the exhaust gas is equal to or lower than the stoichiometric air-fuel ratio,
the supplier performs the in-cylinder rich control to produce $NH_3$ by the NH3 producing catalyst when an $NH_3$ adsorption amount of the selective catalytic reduction catalyst becomes equal to or less than a first $NH_3$ adsorption amount, and
the controller is further programmed to predict that the in-cylinder rich control is performed in the predetermined time period when the $NH_3$ adsorption amount of the selective catalytic reduction catalyst is equal to or less than a second $NH_3$ adsorption amount which is larger than the first $NH_3$ adsorption amount, while predicting that the in-cylinder rich control is not performed in the predetermined time period when the $NH_3$ adsorption amount of the selective catalytic reduction catalyst is greater than the second $NH_3$ adsorption amount.

* * * * *